US012181893B2

(12) United States Patent
Lukaczyk et al.

(10) Patent No.: US 12,181,893 B2
(45) Date of Patent: Dec. 31, 2024

(54) THRUST VECTORING SYSTEM AND PROCESS FOR USE WITH UNMANNED AERIAL VEHICLES

(71) Applicant: FlightWave Aerospace Systems, Santa Monica, CA (US)

(72) Inventors: Trent Lukaczyk, Santa Monica, CA (US); David L. Walter, Santa Monica, CA (US); Michael Colonno, Santa Monica, CA (US)

(73) Assignee: Flightwave Aerospace Systems, Santa Monica, CA (US)

( * ) Notice: Subject to any disclaimer, the term of this patent is extended or adjusted under 35 U.S.C. 154(b) by 339 days.

(21) Appl. No.: 17/330,549

(22) Filed: May 26, 2021

(65) Prior Publication Data
US 2021/0373579 A1 Dec. 2, 2021

Related U.S. Application Data

(60) Provisional application No. 63/031,984, filed on May 29, 2020.

(51) Int. Cl.
*G05D 1/00* (2024.01)
*B64C 27/52* (2006.01)
(Continued)

(52) U.S. Cl.
CPC ............ *G05D 1/102* (2013.01); *B64C 27/52* (2013.01); *B64C 29/0033* (2013.01); *B64D 27/24* (2013.01); *B64D 31/00* (2013.01); *B64U 30/297* (2023.01); *B64U 50/18* (2023.01); *B64U 50/19* (2023.01)

(58) Field of Classification Search
None
See application file for complete search history.

(56) References Cited

U.S. PATENT DOCUMENTS

| 2004/0093130 A1* | 5/2004 | Osder | G05D 1/0858 |
| | | | 244/175 |
| 2011/0226892 A1 | 9/2011 | Crowther et al. | |

(Continued)

FOREIGN PATENT DOCUMENTS

KR 10-2010424 B1 8/2019

OTHER PUBLICATIONS

Rumit Kumar, "Position and Attitude Control by Rotor tilt and Rotor Speed Synchronization for Single Axis Tilting-Rotor Quadcopter", Oct. 2017, Proceedings of the ASME 2017 Dynamic Systems and Control Conference, pp. 1-10 (Year: 2017).*

(Continued)

*Primary Examiner* — Hongye Liang
(74) *Attorney, Agent, or Firm* — BakerHostetler

(57) ABSTRACT

A method for controlling a thrust vectored aircraft includes mapping aircraft control commands with a flight controller through a number of transformations including: transforming, with the flight controller, a command space into an inner-mixing space, which comprises of at least a pair of two orthogonal force components located at each thrusting motor; transforming, with the flight controller, the inner-mixing space into an outer-mixing space, which comprises a thrust angle and thrust magnitude pair located at each thrusting motor; and generating output commands with the flight controller.

31 Claims, 19 Drawing Sheets

(51) Int. Cl.
  *B64C 29/00* (2006.01)
  *B64D 27/24* (2006.01)
  *B64D 31/00* (2006.01)
  *B64U 30/297* (2023.01)
  *B64U 50/18* (2023.01)
  *B64U 50/19* (2023.01)

(56) References Cited

U.S. PATENT DOCUMENTS

| | | |
|---|---|---|
| 2016/0023755 A1 | 1/2016 | Elshafei et al. |
| 2016/0340028 A1* | 11/2016 | Datta ............... B64C 27/08 |
| 2017/0158320 A1 | 6/2017 | Bosch |
| 2019/0329882 A1 | 10/2019 | Baity et al. |
| 2020/0346747 A1 | 11/2020 | Lukaczyk et al. |

OTHER PUBLICATIONS

International Patent Application No. PCT/US2021/034180; Int'l Search Report and Written Opinion; dated Sep. 8, 2021; 10 pages.
European Patent Application No. 21813013.6; Extended Search Report; dated Apr. 26, 2024; 8 pages.

\* cited by examiner

THRUST VECTORING SYSTEM AND PROCESS FOR USE WITH UNMANNED AERIAL VEHICLES

CROSS-REFERENCE TO RELATED APPLICATION

This application claims priority to U.S. Provisional Application No. 63/031,984, filed May 29, 2020, entitled "Thrust Vectoring System And Process For Use With Unmanned Aerial Vehicles," which is incorporated by reference herein in its entirety.

TECHNICAL FIELD

The disclosure is related to a thrust vectoring system for use with aerial vehicles. The disclosure is also related to a thrust vectoring process for use with aerial vehicles. More particularly, the disclosure is related to a thrust vectoring system and process for use with unmanned aerial vehicles.

BACKGROUND

Unmanned Aerial Vehicles (UAVs) may be flown based on a number of different flight modes. One hybrid aerodynamic flight configuration is typically known as a "tilt-rotor" where thrusters are able to rotate to accommodate different flight modes. In a first vertical flight mode, the thrusters point upwards providing vertical thrust in order to fly and/or move generally vertically like a multi-rotor. In a second horizontal flight mode, the thrusters point forward to provide horizontal thrust in order to fly and/or move generally horizontally like a fixed-wing aircraft. This hybrid aerodynamic flight mode is often known as vertical take-off and landing (VTOL). However, many commercial VTOL aircraft implement systems where the rotors can only assume two discrete operational positions—a vertical operational position and a horizontal operational position. This results in a very limited operational capability for the associated VTOL aircraft. Moreover, this limited operational capability can result in other deficiencies—increased weight, limited maneuverability, and/or the like.

Accordingly, a system and/or process is needed for VTOL aircraft to increase operational capability, reduce weight, increase maneuverability, and/or the like. Additionally, a system and/or process is needed for VTOL aircraft further addressing other shortcomings of the prior art is disclosed by the various aspects in the disclosure.

SUMMARY OF THE DISCLOSURE

The disclosure is directed in part to a thrust vectoring algorithm and/or thrust vectoring controller configured to allow for control of an aircraft with a plurality of tilting rotors. Thrust vectoring is a method of controlling the aircraft by pointing the motors in the direction you need thrust, as opposed to traditional methods of flight control surfaces which deflect airflow or tilting the entire body of the aircraft. In particular, the disclosed thrust vectoring algorithm and/or thrust vectoring controller allow for the control of VTOL aircraft with a plurality of tilting rotors. Examples of such an aircraft that may utilize the disclosed thrust vectoring algorithm and/or thrust vectoring controller may include the Edge VTOL aircraft implementing two tilting front rotors, the Jupiter Tri-copter aircraft implementing two tilting front rotors, and/or the Jupiter-Quadrotor implementing four tiltable rotors. Each of these aircraft are available from and/or manufactured by FlightWave Aerospace Systems, Santa Monica, California Of course, numerous other aircraft having one or more tiltable rotors may utilize the disclosed thrust vectoring algorithm and/or thrust vectoring controller as described herein, modified consistent with the application, modified consistent with an implementing aircraft, and/or the like.

The disclosed thrust vectoring algorithm and/or thrust vectoring controller greatly differ from existing tiltrotor algorithms used in many commercial VTOLs where the rotors can only assume two discrete operational positions—a vertical operating position and a horizontal operating position. The disclosed VTOL aircraft may include a servo and the servo may position the tiltrotor or tiltable thrusting motor in the desired operational position. The disclosed thrust vectoring algorithm and/or thrust vectoring controller may allow each tiltrotor to assume any angle in their servo range, allowing actuation of aircraft commands independent of aircraft attitude and/or the like. The disclosed thrust vectoring algorithm and/or thrust vectoring controller may allow the aircraft to move along the longitudinal or lateral axes while the airframe remains level or at any arbitrary roll angle, yaw angle, and/or pitch angle. In particular aspects, the disclosed thrust vectoring algorithm and/or thrust vectoring controller may provide control of the aircraft without any implementation of movable flight surfaces and/or movable aerodynamic control surfaces.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for controlling a thrust vectored aircraft, the thrust vectored aircraft being implemented with one or more tiltable thrusting motors, the method includes mapping aircraft control commands with a flight controller through the following transformations: transforming, with the flight controller, a command space, which include a force command and a moment command, into an inner-mixing space, which include of at least a pair of two orthogonal force components located at each thrusting motor; transforming, with the flight controller, the inner-mixing space into an outer-mixing space, which include a thrust angle and thrust magnitude pair located at each thrusting motor; and generating output commands with the flight controller. Other embodiments of this aspect include corresponding computer systems, apparatus, and computer programs recorded on one or more computer storage devices, each configured to perform the actions of the methods.

One general aspect includes an aircraft system configured to control a thrust vectored aircraft, the thrust vectored aircraft being implemented with one or more tiltable thrusting motors, the aircraft system includes a flight controller configured to map aircraft control commands through the following transformations: the flight controller further configured to transform from a command space, which include a force command and a moment command, into an inner-mixing space, which include at least a pair of two orthogonal force components located at each thrusting motor; the flight controller further configured to transform the inner-mixing space into an outer-mixing space, which include a thrust angle and thrust magnitude pair located at each thrusting motor; and the flight controller further configured to generate output commands. Other embodiments of this aspect include corresponding computer systems, apparatus, and computer programs recorded on one or more computer storage devices, each configured to perform the actions of the methods.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

The foregoing and other features and advantages of the disclosure should be more fully understood from the accompanying detailed description of illustrative embodiments taken in conjunction with the following Figures in which like elements are numbered alike in the several Figures.

DETAILED DESCRIPTION

Figure 1:
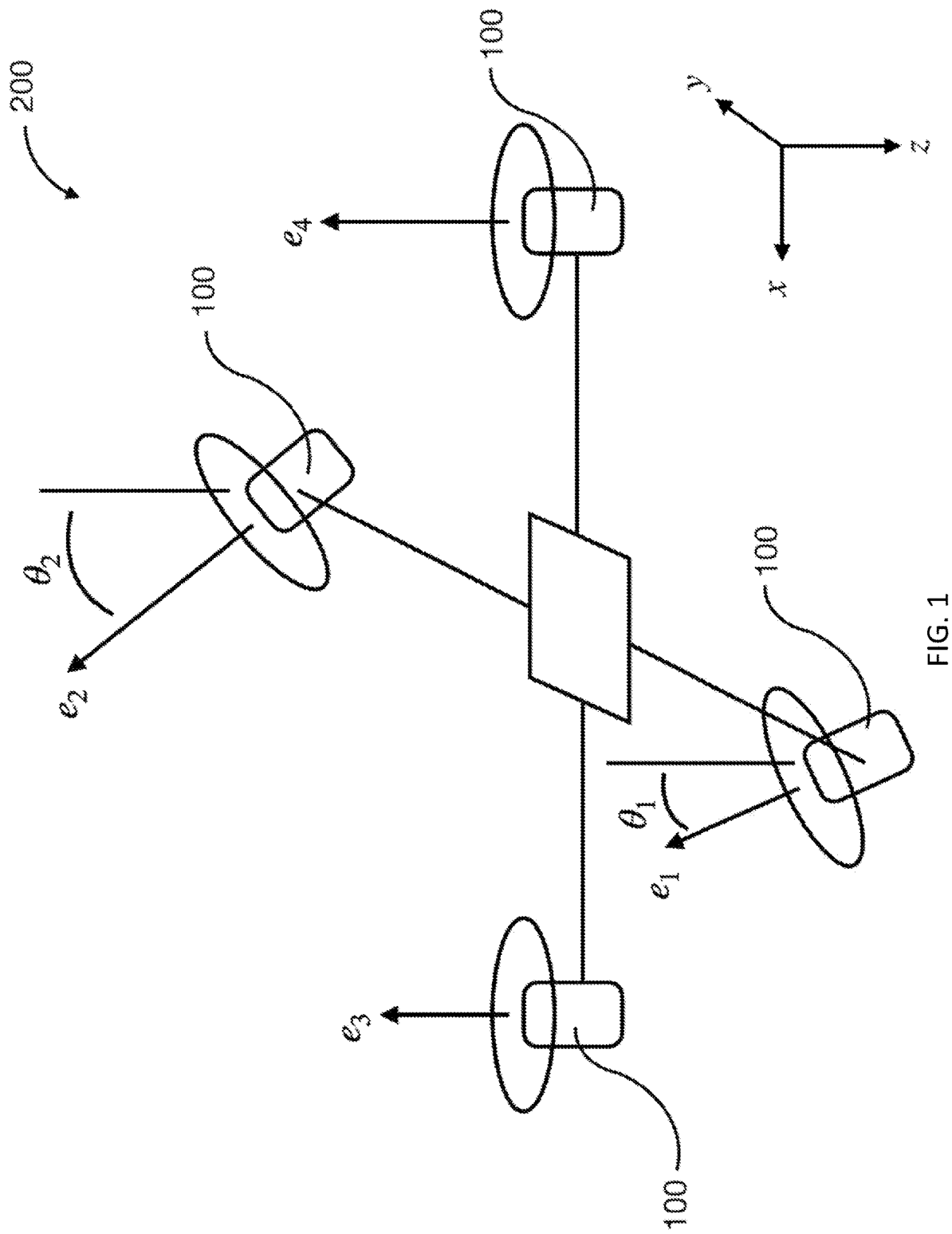
FIG. 1 illustrates exemplary motor outputs for an airframe implementing two tilting motors and two fixed motors in accordance with aspects of the disclosure.

FIG. 1 illustrates exemplary motor outputs for an airframe implementing two tilting motors and two fixed motors in accordance with aspects of the disclosure.

Figure 2:
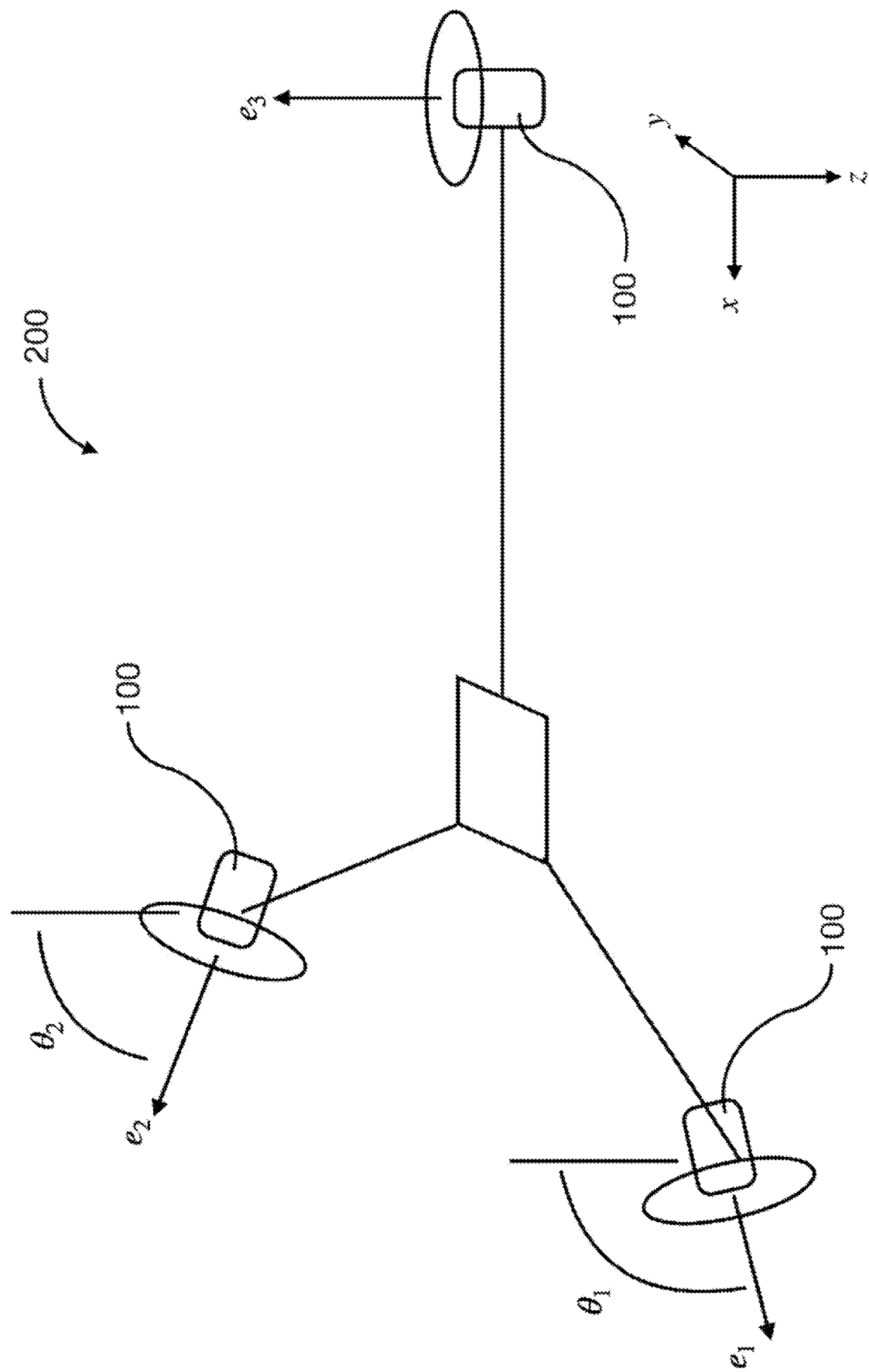
FIG. 2 illustrates exemplary motor outputs for an airframe implementing two tilting motors and one fixed motor in accordance with aspects of the disclosure.

FIG. 2 illustrates exemplary motor outputs for an airframe implementing two tilting motors and one fixed motor in accordance with aspects of the disclosure.

Figure 3:
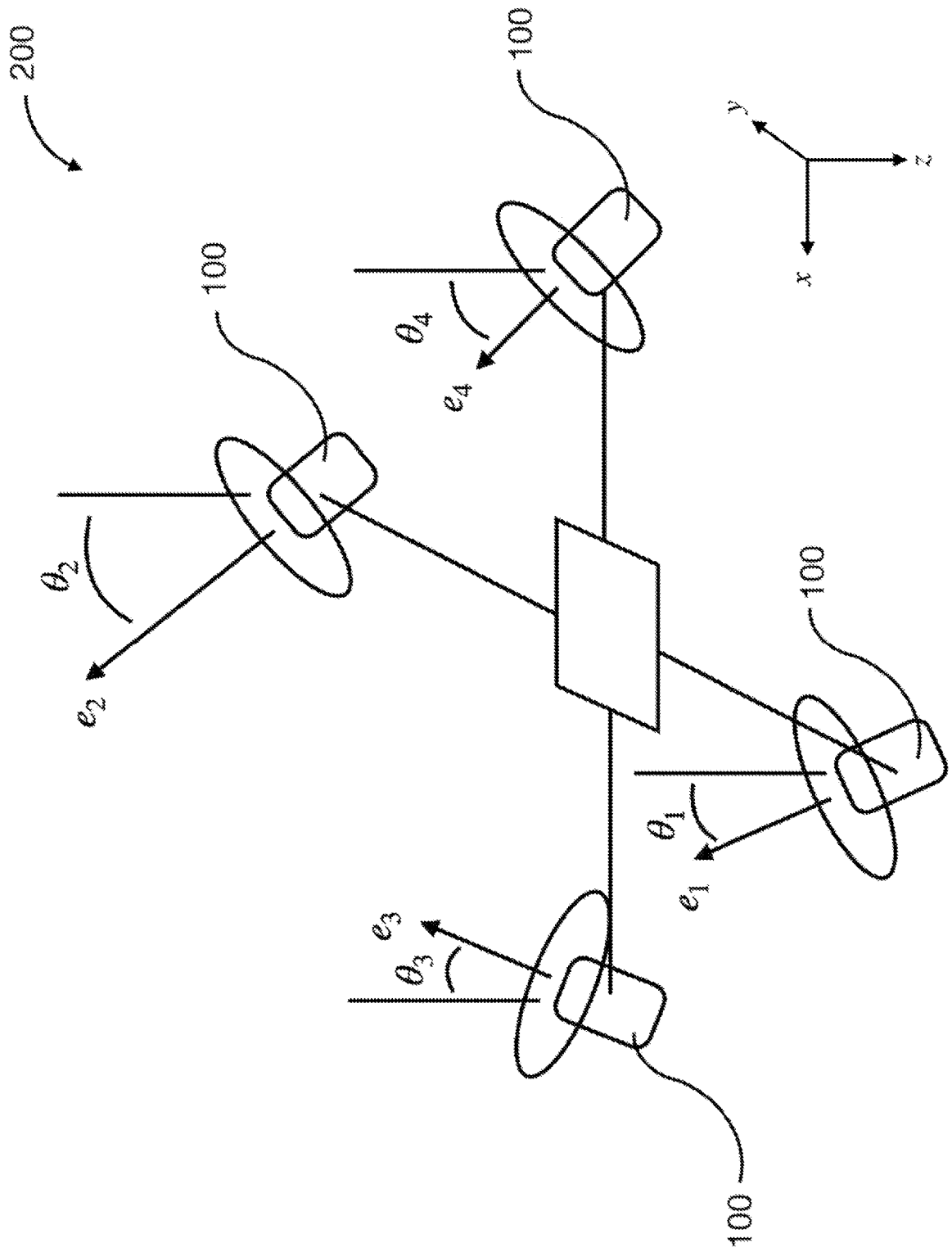
FIG. 3 illustrates an exemplary airframe implementing four tiltable motors in accordance with aspects of the disclosure.

FIG. 3 illustrates an exemplary airframe implementing four tiltable motors in accordance with aspects of the disclosure.

Now referring to the drawings, wherein like reference numbers refer to like elements, FIG. 1, FIG. 2, and FIG. 3 illustrate an aspect of an aircraft 200 or airframe implementing motors 100 in accordance with aspects of the disclosure. In one aspect, the motors 100 may be implemented consistent with the description related to FIGS. 12-19. In other aspects, the motors 100 may be implemented utilizing other configurations. The aircraft 200 may be implemented as an unmanned aerial vehicle and/or the like for use in horizontal-to-vertical take-off and flight. For example, horizontal-to-vertical take-off and flight such as take-off from a landing pad, other locations having little to no runway, and/or the like. In aspects, the aircraft 200 and the motors 100 may implement any one or more of the features described in U.S. patent application Ser. No. 16/819,671, filed Mar. 16, 2020, and commonly owned by Applicant, which is incorporated by reference in its entirety.

FIG. 1, FIG. 2, and FIG. 3 further illustrate that each of the motors 100 may have a motor output vector $e_n$ (motor output vector $e_1$, motor output vector $e_2$, motor output vector $e_3$, . . . motor output vector $e_n$). In one or more aspects, the motor output vector $e_n$ may be a vector extending along a center of thrust of an nth implementation of the motor 100. Additionally, the motor output vector $e_n$ may extend at an angle $\Theta_n$, ($\Theta_1, \Theta_2, \Theta_3, \ldots \Theta_n$) with respect to a vertical axis (or z axis) as illustrated in the Figures. In particular, a thrust of the motor 100 may be a function of the motor output vector $e_n$.

The aircraft 200 may include one or more tilting implementations of the motor 100 and the aircraft 200 may include any number of fixed implementations of the motor 100, which may include zero fixed implementations of the motor 100. In one aspect, the aircraft 200 may implement four of the tiltable thrusting implementations of the motor 100 arranged in a "quad +" configuration. This configuration places one or more implementations of the motor 100 on a centerline of the aircraft. In one aspect, the aircraft 200 may implement four of the tiltable thrusting implementations of the motor 100 arranged in a "quad X" configuration. This configuration places none of the implementations of the motor 100 on the centerline of the aircraft. In one aspect, the aircraft 200 may implement two of the tiltable thrusting implementations of the motor 100 and a single fixed implementation of the motor 100 arranged in a "tri-y" configuration. In one aspect, the aircraft 200 may implement six of the tiltable thrusting implementations of the motor 100 that may be positioned consistent with points of a hexagon to define a "hex" configuration. The "hex" configuration may be symmetrical or asymmetrical. In one aspect, the aircraft 200 may implement eight of the tiltable thrusting implementations of the motor 100 that may be positioned consistent with points of an octagon to define an "octo" configuration. The "octo" configuration may be symmetrical or asymmetrical. However, the disclosure contemplates any configuration of the aircraft 200 implementing any number of tiltable thrusting implementations of the motor 100 and any number of fixed thrusting implementations of the motor 100.

In one aspect as illustrated in FIG. 1, the aircraft 200 may be implemented with two tilting implementations of the motor 100 and the aircraft 200 may be implemented with two fixed implementations of the motor 100. In one aspect as illustrated in FIG. 2, the aircraft 200 may be implemented with two tilting implementations of the motor 100 and the aircraft 200 may be implemented with one fixed implementation of the motor 100. In one aspect as illustrated in FIG. 3, the aircraft 200 may be implemented with four tilting implementations of the motor 100 and the aircraft 200 may be implemented with zero fixed implementations of the motor 100.

Figure 4:
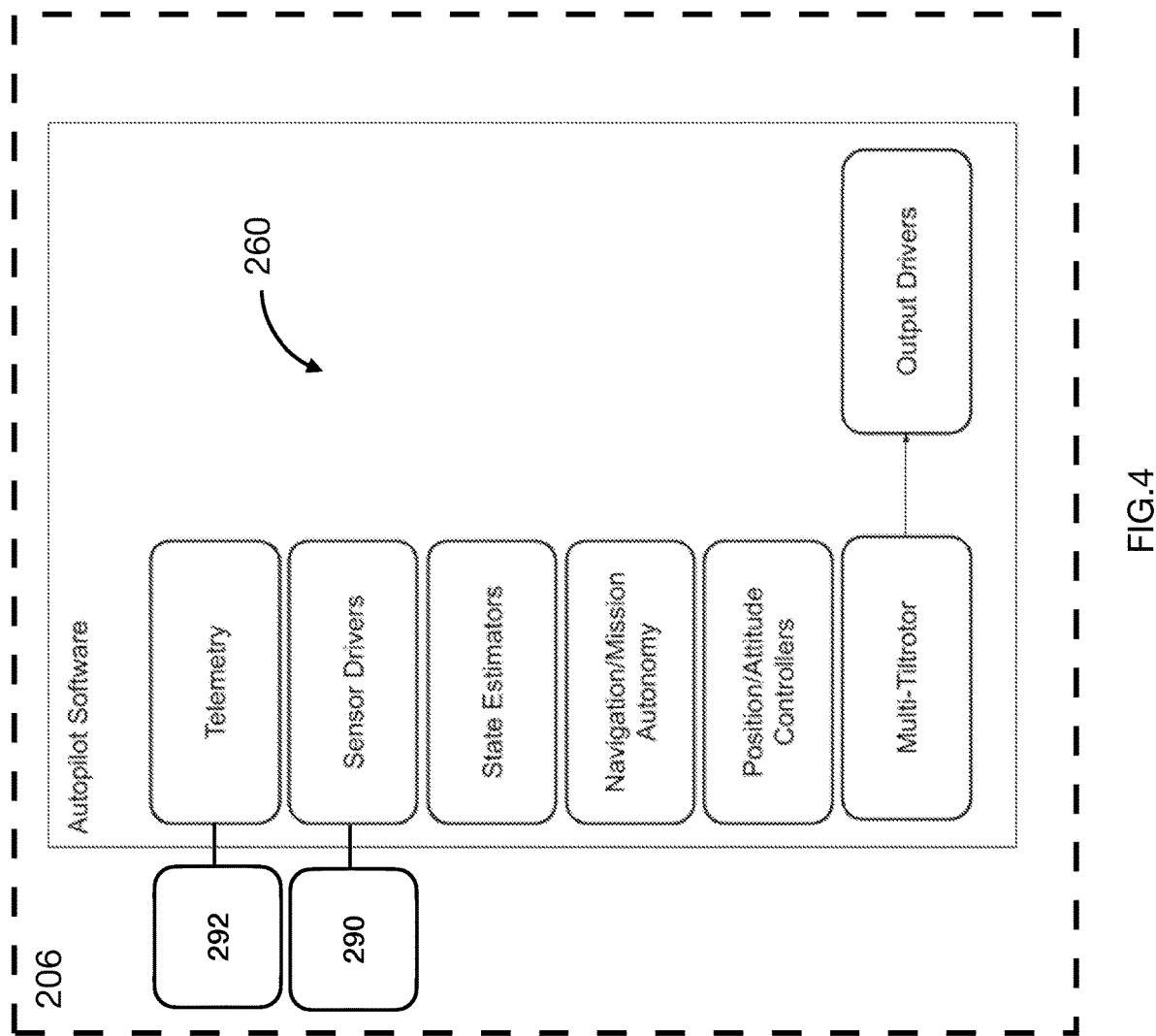
FIG. 4 illustrates a schematic of an autopilot configuration in accordance with aspects of the disclosure.

FIG. 4 illustrates a schematic of an autopilot configuration in accordance with aspects of the disclosure.

With reference to FIG. 4, the aircraft 200 may implement a flight controller 206 or autopilot. The flight controller 206 may control the motors 100 of the aircraft 200. In one or more aspects, the flight controller 206 may control a thrust of the motors 100 of the aircraft 200, the flight controller 206 may control the motor output vector $e_n$ of the motors 100, the flight controller 206 may control the angle $\Theta_n$ of the motors 100, and/or the like. The flight controller 206 may further implement a thrust vectoring algorithm 300 or Multi-Tiltrotor algorithm. Additionally or alternatively, the flight controller 206 may further implement a thrust vectoring controller. The flight controller 206 may include and/or implement a processor, a memory, a read-only memory, an input device, an input/output device, an output device, an analog-to-digital converter, a digital to analog converter, a clock, one or more sensors, a power source, a transceiver, aircraft sensors, telemetry, sensor drivers, state estimators, navigation and/or mission autonomy functionality, position and/or attitude controllers, output drivers, and/or the like. In other aspects, the flight controller 206 may be configured to connect to and/or be responsive to one or more of a processor, a memory, a read-only memory, an input device, an input/output device, an output device, an analog-to-digital converter, a digital to analog converter, a clock, one or more sensors, a power source, a transceiver, aircraft sensors, telemetry, sensor drivers, state estimators, navigation and/or mission autonomy functionality, position and/or attitude controllers, output drivers, and/or the like. The flight controller 206 may be configured and/or implemented to receive commands, wireless commands, autopilot commands, and/or the like. The flight controller 206 may be configured and/or implemented to generate commands, wireless commands, autopilot commands, and/or the like. In some aspects, the flight controller 206 may be configured and/or implemented to utilize artificial intelligence as defined herein.

The flight controller 206 may be implemented as a computer device that may run and/or execute an operating system and/or middleware. In one aspect, the flight controller 206 may be implemented as a small computer device that may run and/or execute a minimal operating system and middleware. The operating system of the flight controller 206 may have one or more features of an operating system such as WINDOWS (available from Microsoft), UBUNTU (available from Canonical Ltd.), and/or the like; and the middleware of the flight controller 206 may have one or more features of a development engine. In one aspect, the middleware of the flight controller 206 may be a software platform configured and/or implemented as technology building blocks, rather than an encapsulated application.

In one or more aspects, the flight controller 206 may implement autopilot middleware such as PX4, Ardupilot, and/or the like. In aspects, the autopilot middleware may implement a flexible set of tools to create a tailored solution for control, operation, and/or the like of the motor 100 and/or the aircraft 200. In aspects, the autopilot middleware may be configured to provide a standard to implement a hardware and a software stack as well as to implement an ecosystem to build and maintain scalable hardware and software for control, operation, and/or the like of the motor 100 and/or the aircraft 200. In aspects, the autopilot middleware may be configured and/or implemented to run on a real-time operating system and may be configured and/or implemented to be responsible for coordinating multiple software modules for control, operation, and/or the like of the motor 100 and/or the aircraft 200. The software may be configured and/or implemented to be modular. In aspects, modules may be configured and/or implemented to be added, removed, or replaced by the user to customize for a particular airframe. The software modules 260 may be implemented and/or configured as an autopilot stack and may include the following implementations, functions, and/or configurations:

Sensor driver functionality—that may implement low level software that may handle configuring, reading, and/or the like of sensor information from aircraft sensors 290, such as magnetometers, gyroscopes, accelerometers, airspeed sensors, GNSS (global navigation satellite system) receivers, range finders, radios, and/or the like. In various aspects, the sensor driver functionality may be implemented as software, software modules, hardware, hardware modules, and/or the like.

Telemetry functionality—that may implement communication between the ground station and the aircraft 200, relaying, receiving, transmitting, generating, and/or the like commands, sending, receiving, generating, and/or the like information to a pilot, and/or the like. In various aspects, the Telemetry functionality may be implemented as software, software modules, hardware, hardware modules, and/or the like.

Safety, Command and Control functionality—that may allow operation of the aircraft 200 only when safety criteria are met. The Safety, Command and Control functionality may also override behavior in case of emergency. Additionally, the Safety, Command and Control functionality may also handle execution of pilot commands and routing. In various aspects, the Safety, Command and Control functionality may be implemented as software, software modules, hardware, hardware modules, and/or the like.

State Estimator functionality—that may handle a fusion of different implementations of the aircraft sensors 290 being read at different intervals and with varying accuracy into usable information about a state of the aircraft 200, its uncertainty, and/or the like. In various aspects, the State Estimator functionality may be implemented as software, software modules, hardware, hardware modules, and/or the like.

Navigation/Mission Autonomy functionality—may generate setpoints for the aircraft 200 to follow in order to conduct a loaded mission or pilot command and/or the like. In various aspects, the Navigation/Mission Autonomy functionality may be implemented as software, software modules, hardware, hardware modules, and/or the like.

Position/Attitude Controller functionality—that may generate control commands of force and moments for the aircraft 200 to follow a given setpoint and/or the like. In various aspects, the Position/Attitude Controller functionality may be implemented as software, software modules, hardware, hardware modules, and/or the like.

Output Driver functionality—that may implement low level software that communicates with output devices such as the motors 100 and servos and/or the like. In one or more aspects, the Output Driver functionality may implement protocols including pulse width modulation (PWM), Controller Area Network (CAN), and/or the like. In various aspects, the Output Driver functionality may be implemented as software, software modules, hardware, hardware modules, and/or the like.

The flight controller 206 may be configured such that the data may be passed between each module. The flight controller 206 may be configured to implement a method that may include using a publish system, a subscribe system, and/or the like where each module publishes its outputs to a shared data bus, to which other modules may subscribe. This configuration of the flight controller 206 may allow the different modules to operate asynchronously, keeps different modules independent of each other, and/or the like.

Additionally, the aircraft 200 and/or the flight controller 206 may include aircraft sensors 290. The aircraft sensors 290 may include one or more of a magnetometer, a gyroscope, an accelerometer, an airspeed sensor, a GNSS receiver, a range finder, a radio, and/or the like. Moreover, the aircraft 200 and/or the flight controller 206 may include a transceiver 292. The transceiver 292 may operate in conjunction with the telemetry functionality to provide communication between the ground station and the aircraft 200, relaying, receiving, transmitting, generating, and/or the like commands, sending, receiving, generating, and/or the like information to a pilot, and/or the like over communication channel as defined herein.

As may be appreciated by those skilled in the art, the illustrated structure of the software modules 260 is a logical structure and not a physical one. Accordingly, the illustrated implementations of the software modules 260 can be implemented by employing various hardware and software components. In addition, two or more of the logical components can be implemented as a single module that provides functionality for both components. Moreover, two or more modules may implement the logical functionality of a single module. In one aspect, the components are implemented as software program modules.

Figure 5:
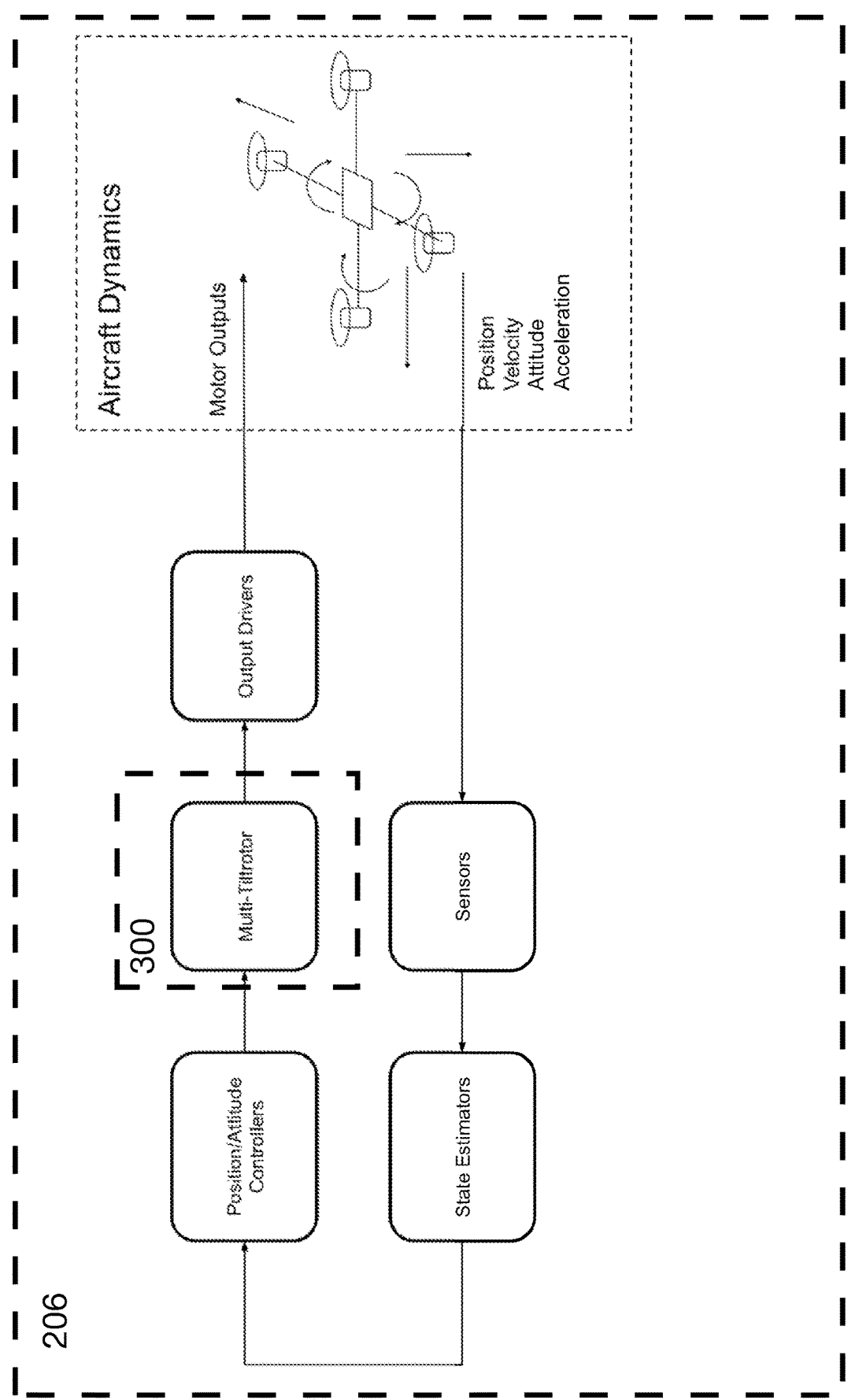
FIG. 5 illustrates a schematic of a control system configuration in accordance with aspects of the disclosure.

FIG. 5 illustrates a schematic of a control system configuration in accordance with aspects of the disclosure.

Attitude and Position Controllers

One of the modules that may be implemented in multicopter flight stacks may be the position and attitude controller. Quadcopters are inherently unstable. In this regard, the stability can be analogous to an inverted pendulum—any disturbance will cause the aircraft 200 to depart stable flight. Because of this, the position and attitude controller may require some kind of control feedback loop to constantly correct attitude and maintain controlled flight of the aircraft 200. These controllers may be configured to be independent of geometry of the aircraft 200 or the number of the motors 100 implement by the aircraft 200. In one or more aspects, the position and attitude controller may be implemented by the flight controller 206, the position and attitude controller may be the flight controller 206, the position and attitude controller may be implemented in conjunction with the flight controller 206, and/or the like. In various aspects, the position and attitude controller may be implemented as software, software modules, hardware, hardware modules, and/or the like.

Control systems of the disclosure may rely on a feedback loop where outputs may be measured and returned for comparison to a setpoint (analogous to, for example, thermostats). As illustrated in FIG. 5, the motors 100 of the aircraft 200 may be implemented such that control may be looped back to the flight controller 206 through the sensors, a state estimator, and/or the like. A state estimator may be used because many of the aircraft states are not directly measured, are measured by multiple sensors which must be statistically combined, and/or the like. In various aspects, the control systems may be implemented as software, software modules, hardware, hardware modules, and/or the like.

Attitude and position controllers may use setpoints, state estimates, and/or the like of the aircraft 200 to generate a set of moment and force commands for the aircraft to achieve the given setpoint. Their control methods may vary from simple proportional gain loops to predictive systems using complex aircraft models. In one aspect, the attitude controller may be a human pilot using their eyes and inner ear to keep an aircraft coordinated and level with a control stick. In various aspects, the attitude and position controllers may be implemented as software, software modules, hardware, hardware modules, and/or the like.

The source of the attitude controller may be independent from the thrust vectoring algorithm 300. The thrust vectoring algorithm 300 can be used with any autopilot controller, with a human pilot, and/or the like. In various aspects, the thrust vectoring algorithm 300 may be implemented as software, software modules, hardware, hardware modules, and/or the like.

In some aspects, an output of the controller may be mapped to fixed implementations of the motors 100 using a "mixer." The mixer may map the roll, pitch, and/or yaw moment commands and a single vertical thrust command to motor outputs—as well as fixed wing aerodynamic control surfaces such as ailerons, rudders, elevators, and/or the like. These mixers may be calculated using basic geometry of the aircraft 200 along with hand tuning in flight.

Figure 6:
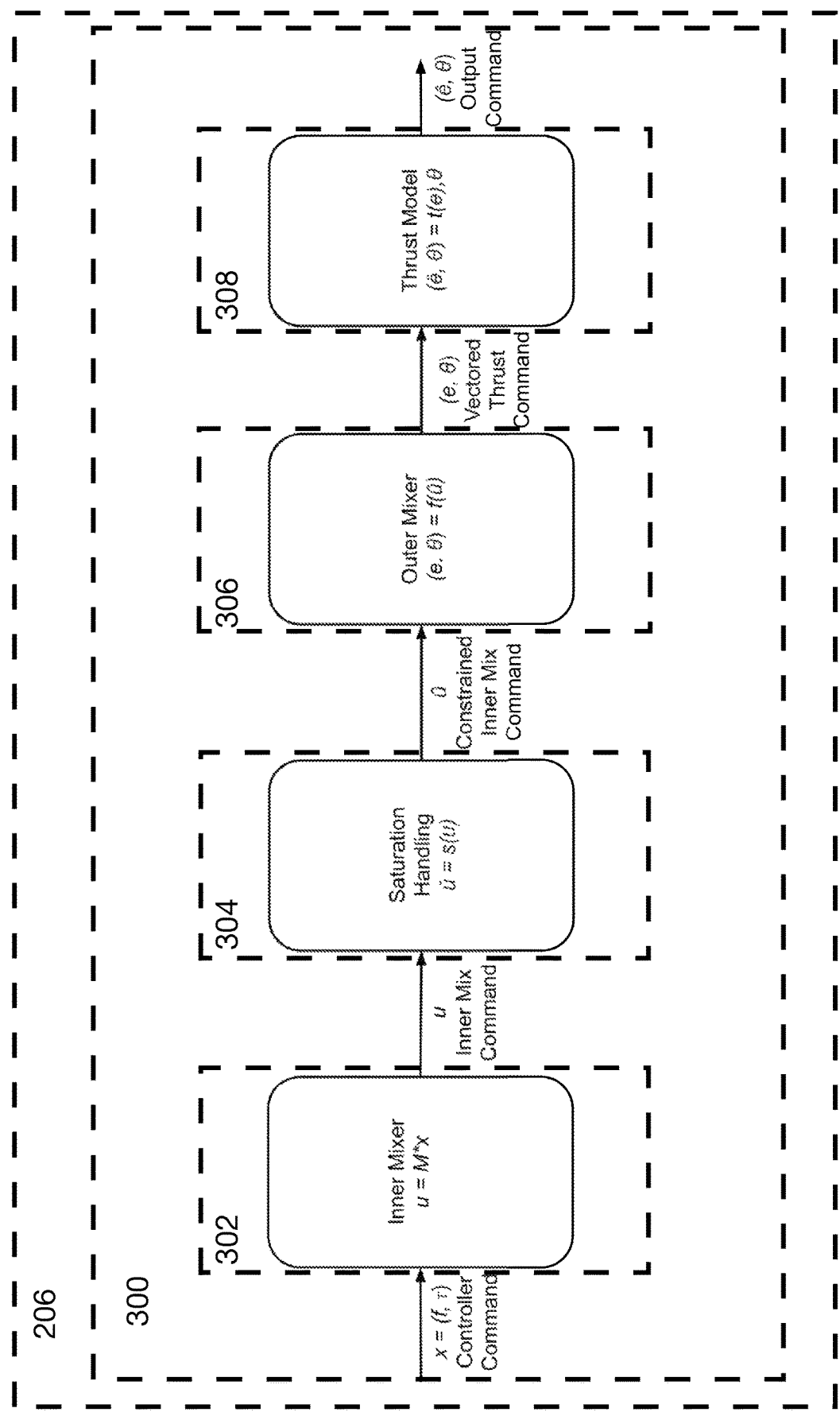
FIG. 6 illustrates a schematic of a thrust vectoring algorithm in accordance with aspects of the disclosure.

FIG. 6 illustrates a schematic of a thrust vectoring algorithm in accordance with aspects of the disclosure.

In particular, FIG. 6 illustrates the thrust vectoring algorithm 300 or Multi-Tiltrotor algorithm. The attitude controller may output moment and force commands, which may be converted into an actuation space for fixed implementations of the motors 100 to apply. With thrust vectoring, this becomes more complicated as the dimensions in the output space increases and the geometry can no longer be expected to remain fixed.

This problem is solved by the disclosed thrust vectoring algorithm 300 that may accept a six degree-of-freedom (DOF) controller command of moments and forces, outputting a 2 n+m DOF thrust vector command—where n is the number of tiltable implementations of the motors 100, and m is the number of fixed implementations of the motors 100.

The thrust vectoring algorithm 300 may first convert the controller output to a fixed dimensional inner mixing space using an inner mixer 302, which may be constructed from horizontal and vertical components of each tiltable implementation of the motor 100. This may be a linear transformation and may be based on the geometry of the aircraft 200, distances of each implementation of the motor 100 from the center of mass of the aircraft 200, and/or the like. In various aspects, the inner mixer 302 may be implemented as software, software modules, hardware, hardware modules, and/or the like.

Next, the command must be constrained with a saturation handling 304 to generate a feasible output that the motors 100 and servos of the aircraft 200 can actuate. In particular, the output command must be constrained in case of saturation, where the desired command generates motor thrust greater than what an implementation of the motor 100 can output, motor angles outside of the fixed bounds of the servos, and/or the like. There are various methods to safely constrain the command and maintain controlled flight. In various aspects, the saturation handling 304 may be implemented as software, software modules, hardware, hardware modules, and/or the like.

The constrained inner mix command may be transformed using an outer mixer 306 into an outer-mixing space or output space of vectored thrust commands, y (en, Θn), constructed from magnitudes and angles of each motor command. In various aspects, the outer mixer 306 may be implemented as software, software modules, hardware, hardware modules, and/or the like.

Finally, the normalized thrust command generated from the outer mixer 306 may be transformed using a thrust model 308 based on the propeller and motor combination and current battery voltage level which may be experimentally measured. This generates an output command that may be compensated for real world motor inefficiencies.

In particular aspects, the flight controller 206 implementing the thrust vectoring algorithm 300 may provide control of the aircraft 200 without any implementation of movable flight surfaces and/or movable flight control surfaces, and/or aerodynamic flight control surfaces such as ailerons, elevators and elevons. In other words, the aircraft 200 may be implemented without movable flight surfaces and/or movable flight control surfaces and the flight controller 206 implementing the thrust vectoring algorithm 300 may provide control of the aircraft 200.

Figure 7:
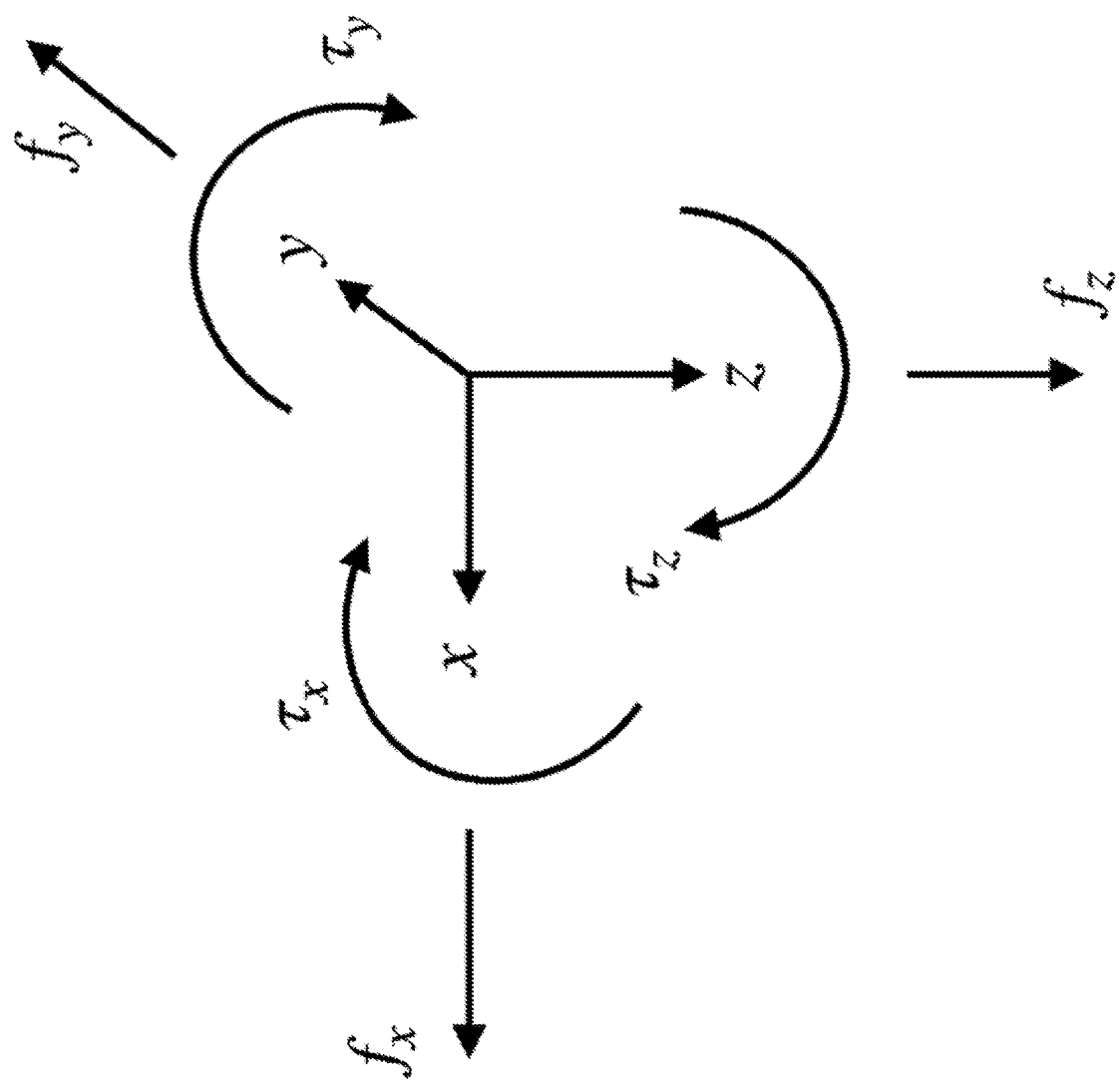
FIG. 7 illustrates controller inputs to the thrust vectoring algorithm of FIG. 6.

FIG. 7 illustrates controller outputs from the thrust vectoring algorithm of FIG. 6.

Figure 8:
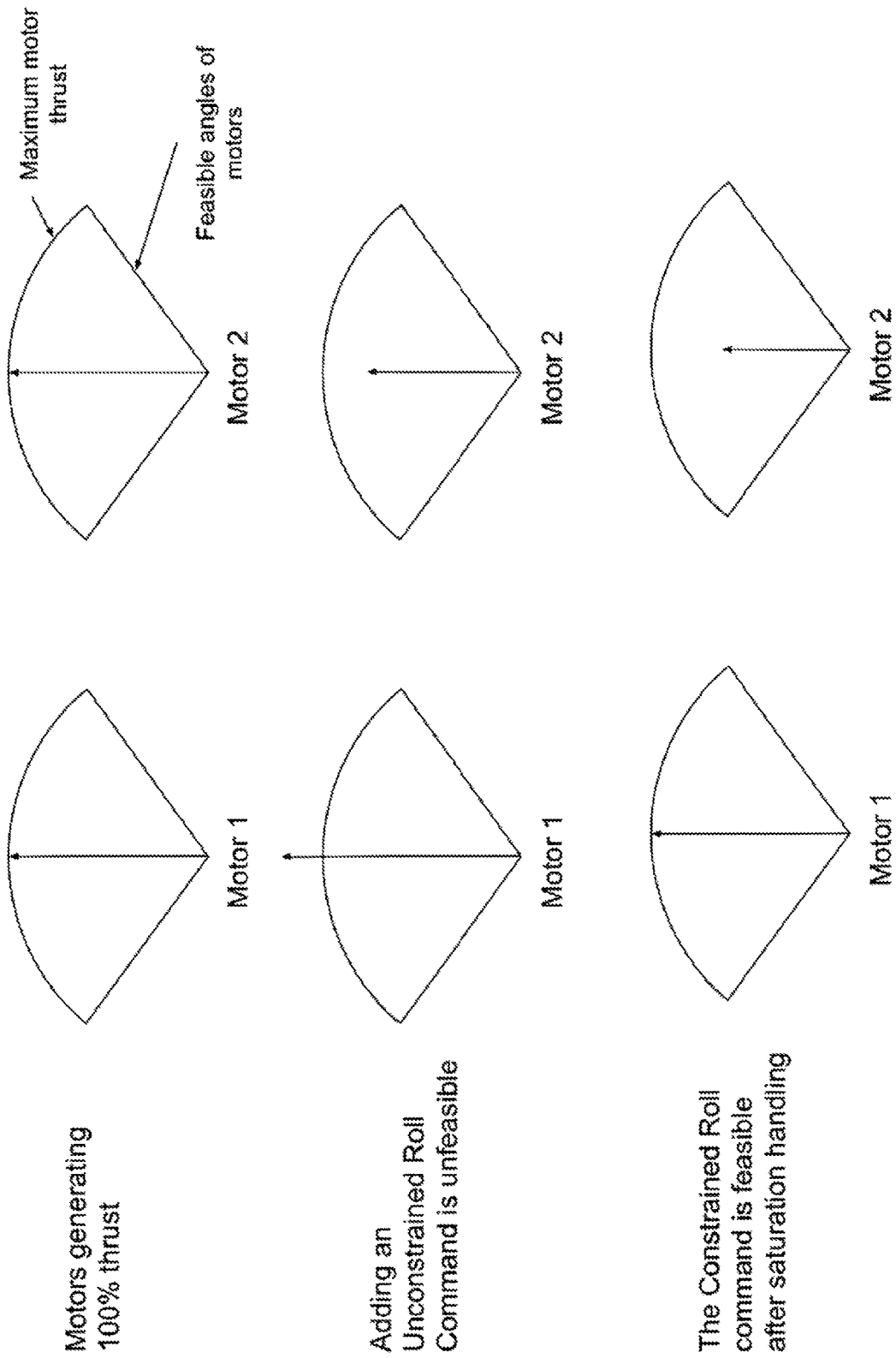
FIG. 8 illustrates diagrams showing motor operating constraints, examples where mixing may generate an unfeasible command for a motor, and an application of saturation handling to transform a command into a feasible command in accordance with aspects of the disclosure.

FIG. 8 illustrates diagrams showing motor operating constraints, examples where mixing may generate an unfeasible command for a motor, and an application of saturation handling to transform a command into a feasible command in accordance with aspects of the disclosure.

Figure 9:
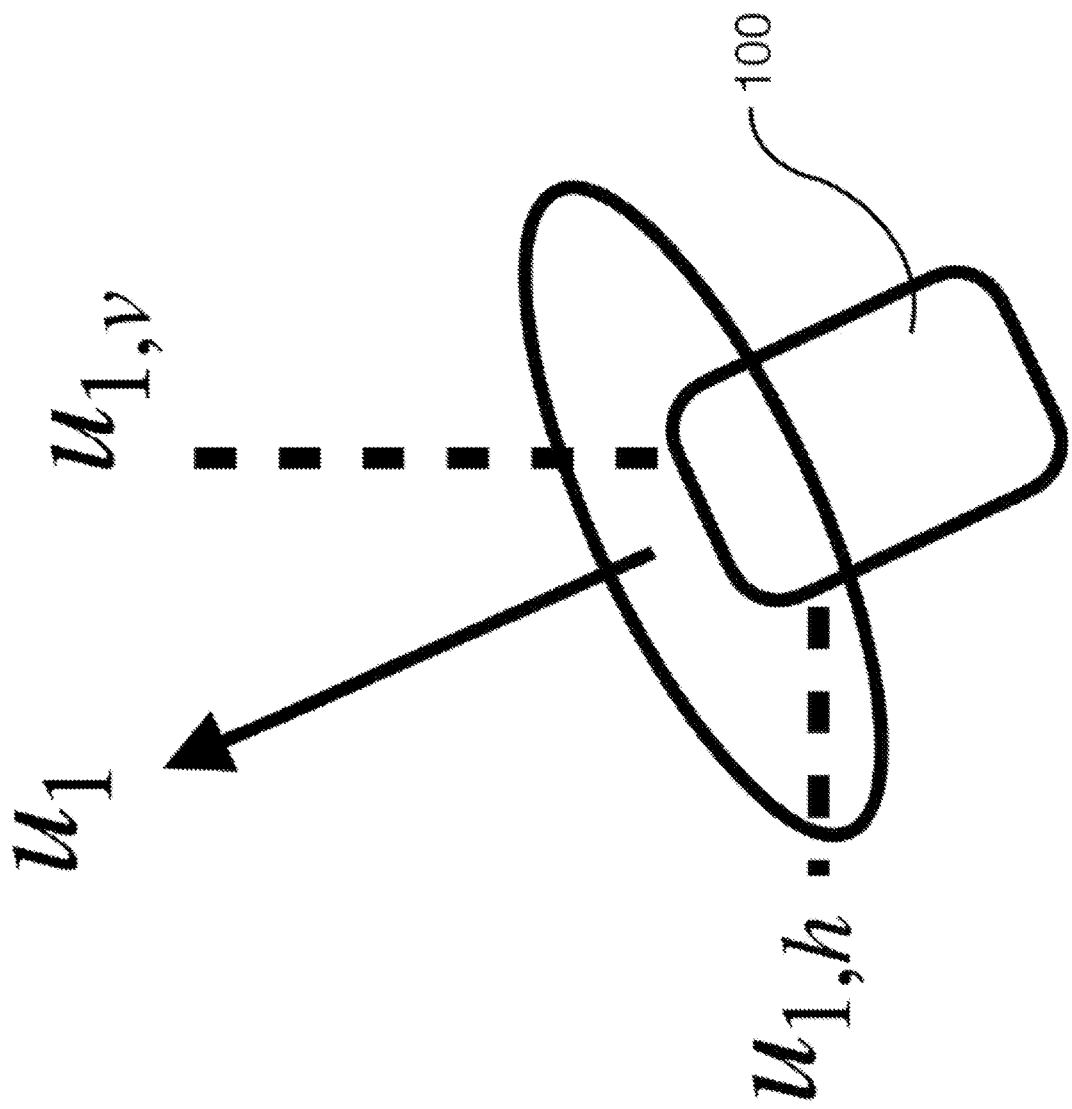
FIG. 9 illustrates inner mixing space from the thrust vectoring algorithm of FIG. 6.

FIG. 9 illustrates inner mixing space from the thrust vectoring algorithm of FIG. 6.

Figure 10:
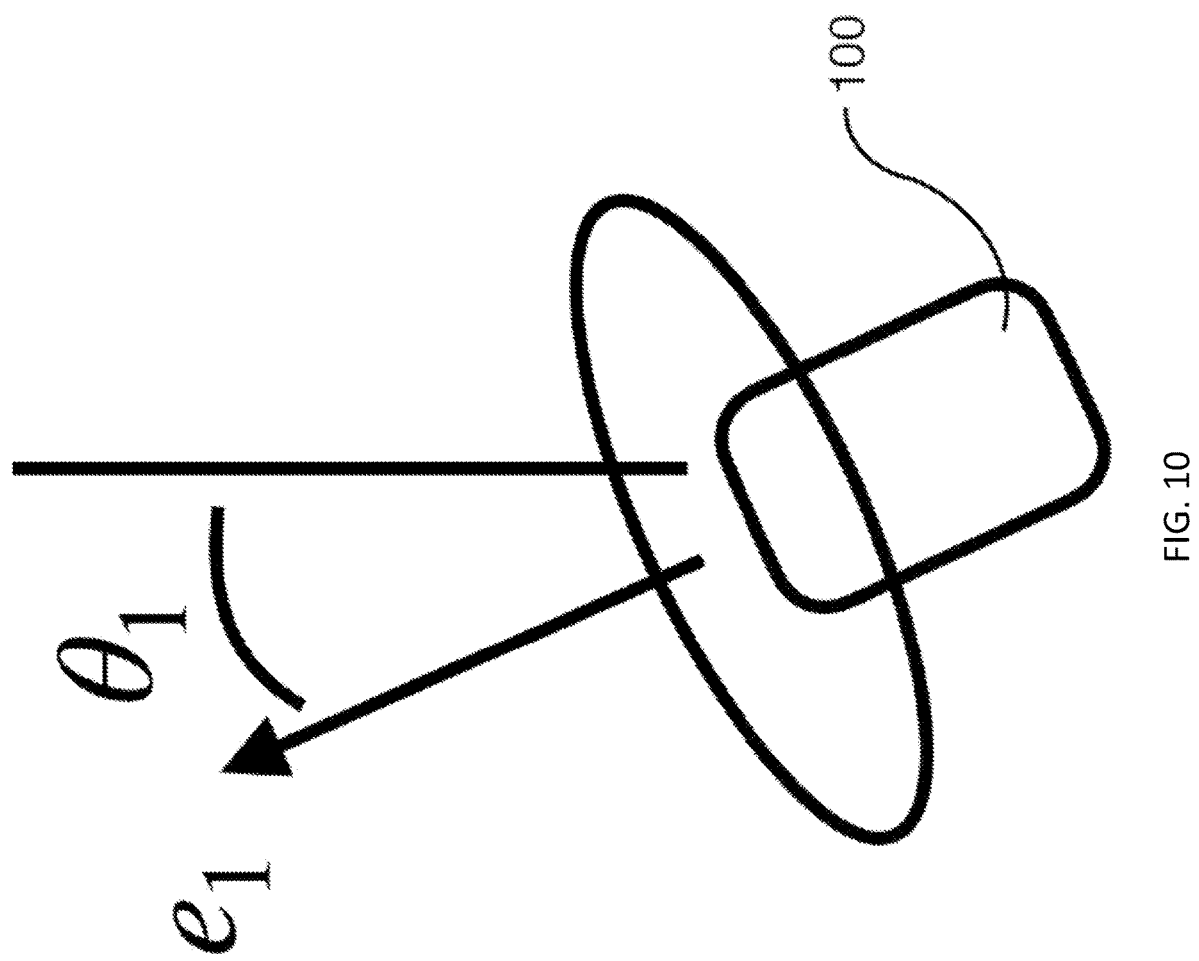
FIG. 10 illustrates outer mixing space from the thrust vectoring algorithm of FIG. 6.

FIG. 10 illustrates outer mixing space from the thrust vectoring algorithm of FIG. 6.

Figure 11:
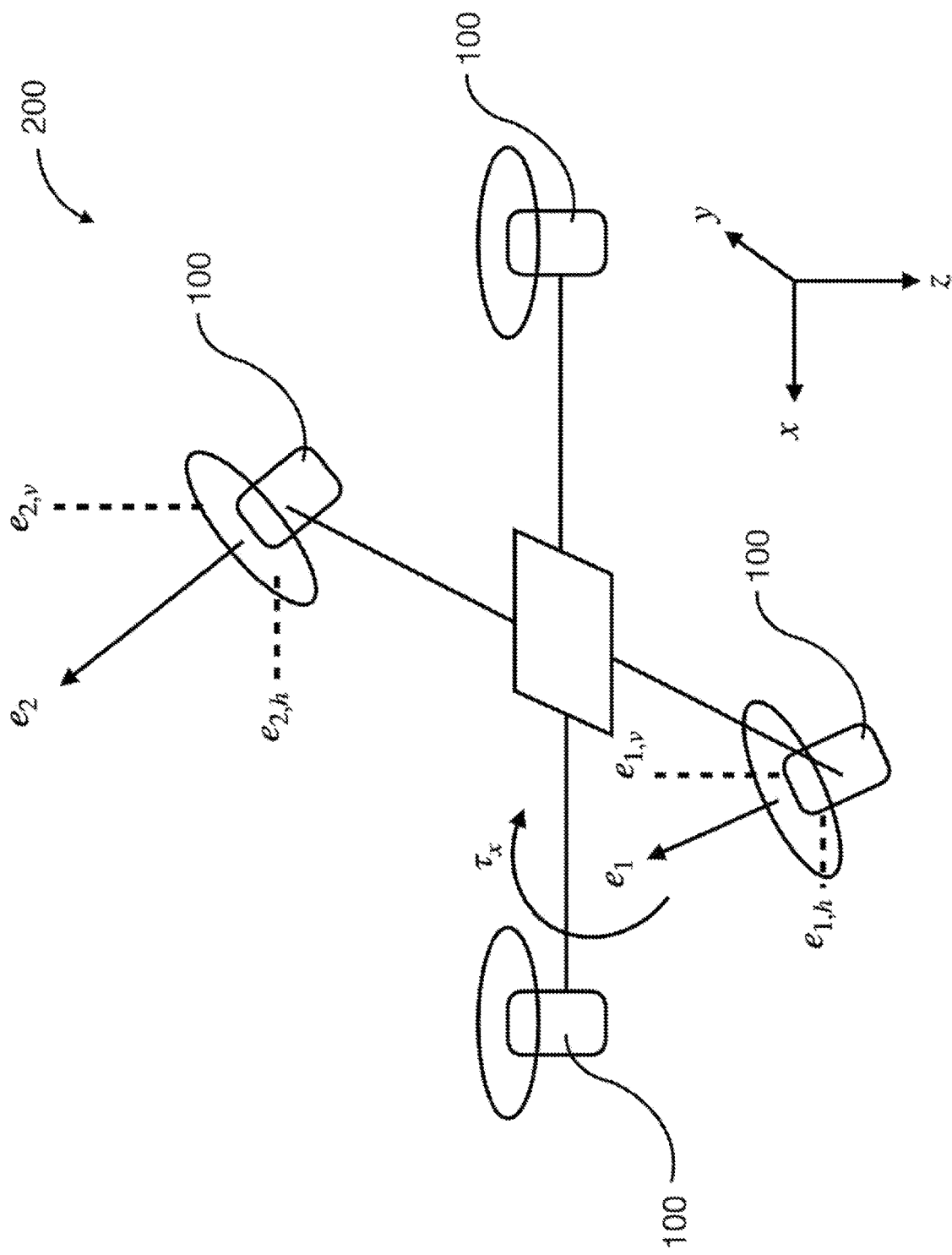
FIG. 11 illustrates an example schematic illustrating a methodology for calculation of a roll moment utilizing a sum of vertical components of two motors in accordance with aspects of the disclosure.

FIG. 11 illustrates an example schematic illustrating a methodology for calculation of a roll moment utilizing a sum of vertical components of two motors in accordance with aspects of the disclosure.

What follows is a description of Unconstrained Mixing.

For the purpose of this disclosure, unconstrained mixing may be a mapping from controller commands to motor outputs. Controller commands may include the roll, pitch, and/or yaw moments and longitudinal, lateral, and/or vertical forces representing the six degrees-of-freedom of the aircraft body. Motor output may be the thrust and angle of each tiltable implementation of the motor 100 and thrust of each fixed implementation of the motor 100. In one or more aspects, standardized control commands may be provided and/or generated with four degrees-of-freedom. If needed, these standardized four degrees-of-freedom control commands may be extended to six degrees-of-freedom by conversion.

What Follows is a Description of Mixing

The core of this mapping is the Mixing Matrix, which may be a linear function represented by a 2 n+m×6 matrix (where n is the number of tiltable implementations of the motor 100 and m is the number of fixed implementations of the motor 100). The mixing matrix may be represented as:

$$u = Mx$$

The Mixing Matrix, M, may be applied on the command vector, x, outputting into inner mix command, u, the required horizontal and vertical components of thrust for each implementation of the motor 100 in order to actuate the requested controller command. This may be referred to as mapping from command space to inner mixing space.

Note that FIG. 7 illustrates the controller command for forces ($f_x$, $f_y$, $f_z$) and torques ($\tau_x$, $\tau_y$, $\tau_z$) in the aircraft reference frame; and FIG. 9 illustrates the inner Mixing Space—horizontal and vertical components of each motor ($u_{1,h}, u_{1,v}$).

After this linear transformation, the command may again be mapped from inner mixing space to the outer-mixing space or output space where the horizontal and vertical components of each implementation of the motor 100 may be transformed into thrusts and angles. Operation in the outer mixer 306 may be represented as:

$$e_j = (u_{j,h}^2 + u_{j,v}^2)^{1/2}$$

$$\theta_j = a \tan 2(u_{j,h}, u_{j,v})$$

In one or more aspects, the outer-mixing space or output space may be a 2 n+m DOF vector space made up of the individual basis vectors of each implementation of the motor 100 (vertical and horizontal). This motor thrust and angle can be scaled and sent out to the corresponding implementations of the motors 100, the servos associated with the motors 100, and/or the like.

What Follows is a Description of Constrained Mixing

With reference to FIG. 8, operation of a motor 1 and a motor 2 is illustrated in diagrams where a length of a vector is indicative of motor thrust and an angle of the vector is indicative of a motor angle. In particular, the top row illustrates motor 1 and motor 2 operating at 100% thrust. The middle row of diagrams illustrates motor 1 and motor 2 after a command has been added. In particular, note that the thrust vector of motor 1 exceeds 100% with the vector extending outside the diagram, which is infeasible for the motor 1 to operate. Finally, the bottom row of diagrams illustrates an application of saturation handling as described herein to transform the command into a feasible one while maintaining the intent for commanding roll. In particular, the saturation handling 304 from the thrust vectoring algorithm 300 of FIG. 6 may be utilized.

When the output command is within the ranges of the motors and servos, the command may be passed through the algorithm as described for outer mixing. Saturation handling 304 may only occur when the output command is infeasible—such as motor thrusts beyond a motor's maximum thrust or commanded angles outside the servo range of motion.

An example is if the aircraft 200 were generating a vertical force that required 100% from every motor. In order to additionally create a roll moment, motor 1 would have to generate greater than 100% thrust. This is impossible as a motor cannot generate more than its max thrust. See the diagram illustrated in FIG. 8.

Unfortunately, it is not as simple as just reducing the output commands to each motor—this would result in unstable flight. Rather, it requires changing the requested controller command of moments and forces into a new command that is feasible. Additionally, this task must be completed in a predictable amount of time for real-time applications.

The constraint algorithm may be configured, implemented, and/or executed such that it will always output a feasible motor output that the aircraft 200 can safely actuate and remain in controlled flight.

Note that FIG. 10 illustrates the Outer Mixing Space—Motor thrust and angles. In this regard, transforming the command from the inner mixing space to the outer mixing space may be a non-linear transformation completed by calculating the desired motor thrust from the 2-norm of the vertical and horizontal components and the desired motor angle from arctangent of the vertical and horizontal components. This approach is applied to each tiltable motor, previously noted with index j.

What Follows is a Description of Calculating the Linear Mixing Matrix

To use the above mixing method in practice, a Mixing matrix M must be determined. Its purpose is to take unit force and moments as input and generate actuator forces for the motors 100 of the aircraft 200.

Several methods exist to determine the linear Mixing function. A common method to generate the Mixing Matrix is to calculate the inverse transformation from unit forces and moments generated by the motors using normalized motor models and geometry around the center of mass. The Mixing Matrix can then be generated by taking the pseudoinverse. Other methods are contemplated as well and form part of this disclosure.

Additionally, this matrix may be refined by tuning it experimentally. The process may require creating impulse commands for each component of the input command vector. Each element of the matrix may be adjusted until an un-coupled response is generated to this command.

A simple example is that the roll moment of the aircraft 200 (rotation about the x-axis) would be the linear sum of the vertical component of motor 1 and the negative vertical component of motor 2 (motor 2 fights a positive roll). Similarly, the longitudinal force on the aircraft 200 (forward in the x-direction) would be the sum of the horizontal components of motor 1 and motor 2.

Continuing the above process for each rotational moment and linear force on the aircraft 200 generates a 6-row×2 n column matrix, where n is the number of motors. Taking the pseudo-inverse of this matrix results in the 2 n×6 Mixing Matrix where each column is normalized using the infinity norm of its values.

Figure 12:
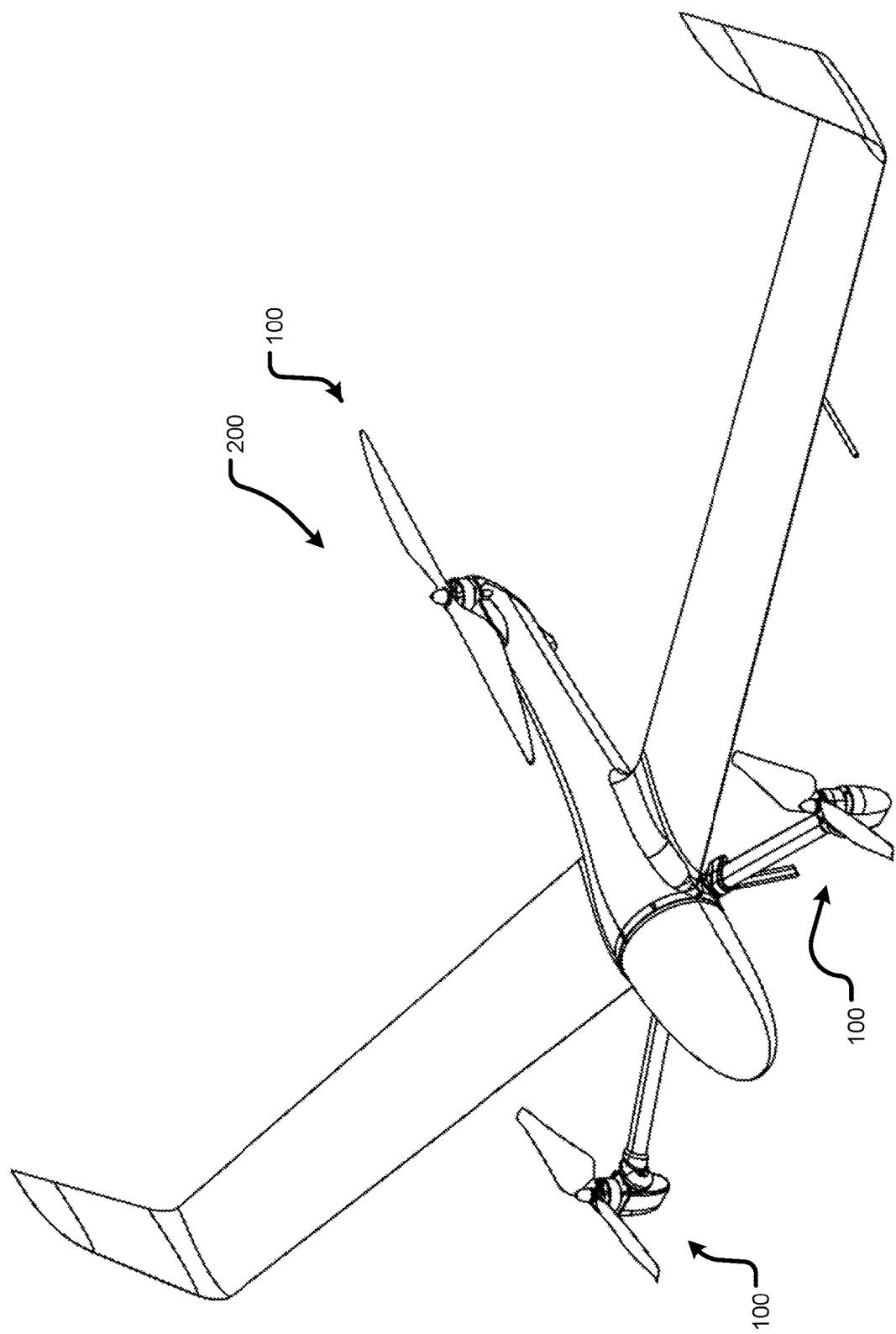
FIG. 12 illustrates an exemplary airframe implementing two tilting motors and one fixed motor in accordance with aspects of the disclosure.

FIG. 12 illustrates an exemplary airframe implementing two tilting motors and one fixed motor in accordance with aspects of the disclosure.

Figure 13:
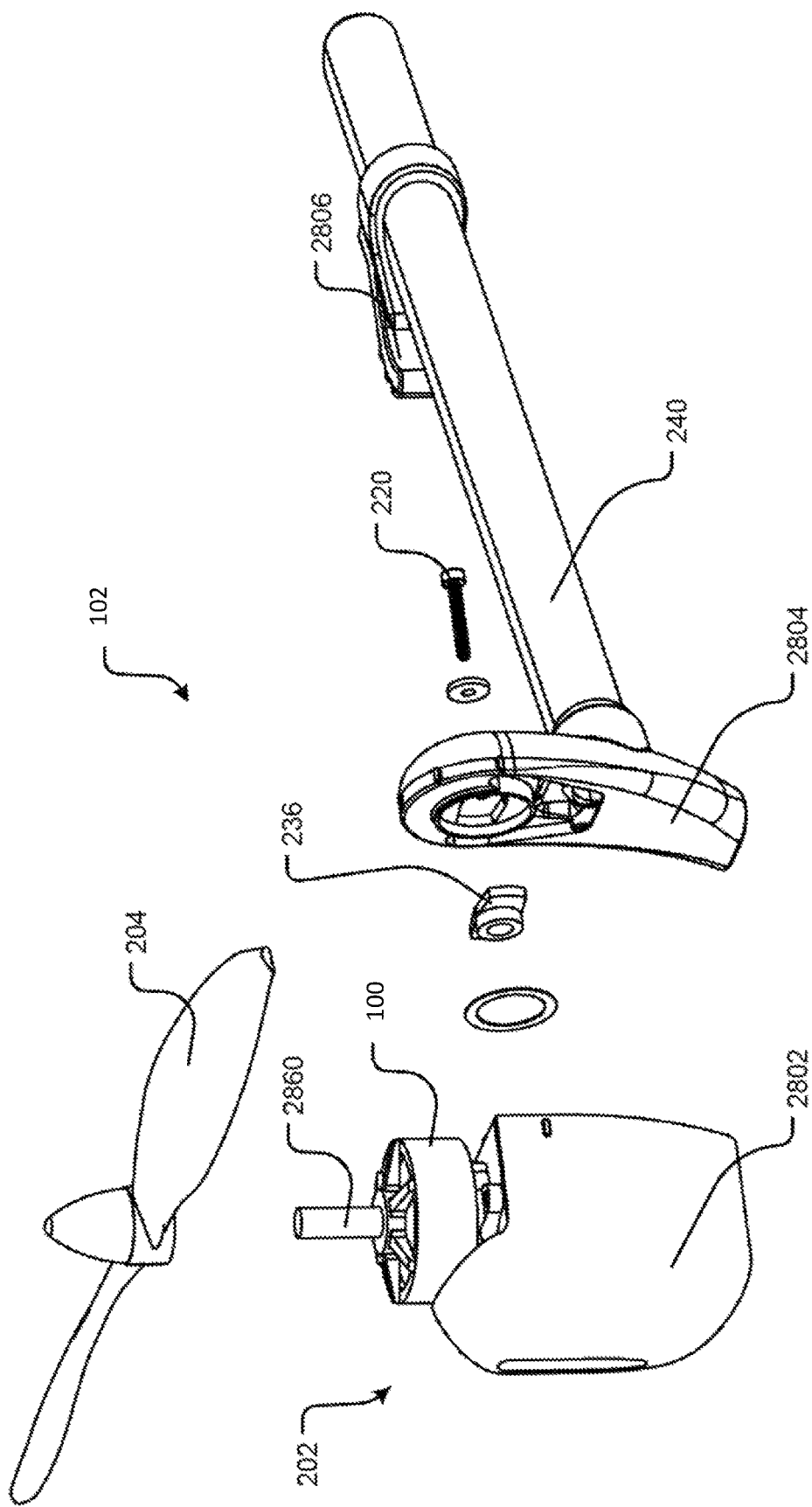
FIG. 13 illustrates an exploded view of a gimbaled thruster in accordance with aspects of the present disclosure.

FIG. 13 illustrates an exploded view of a gimbaled thruster in accordance with aspects of the present disclosure.

Figure 14:
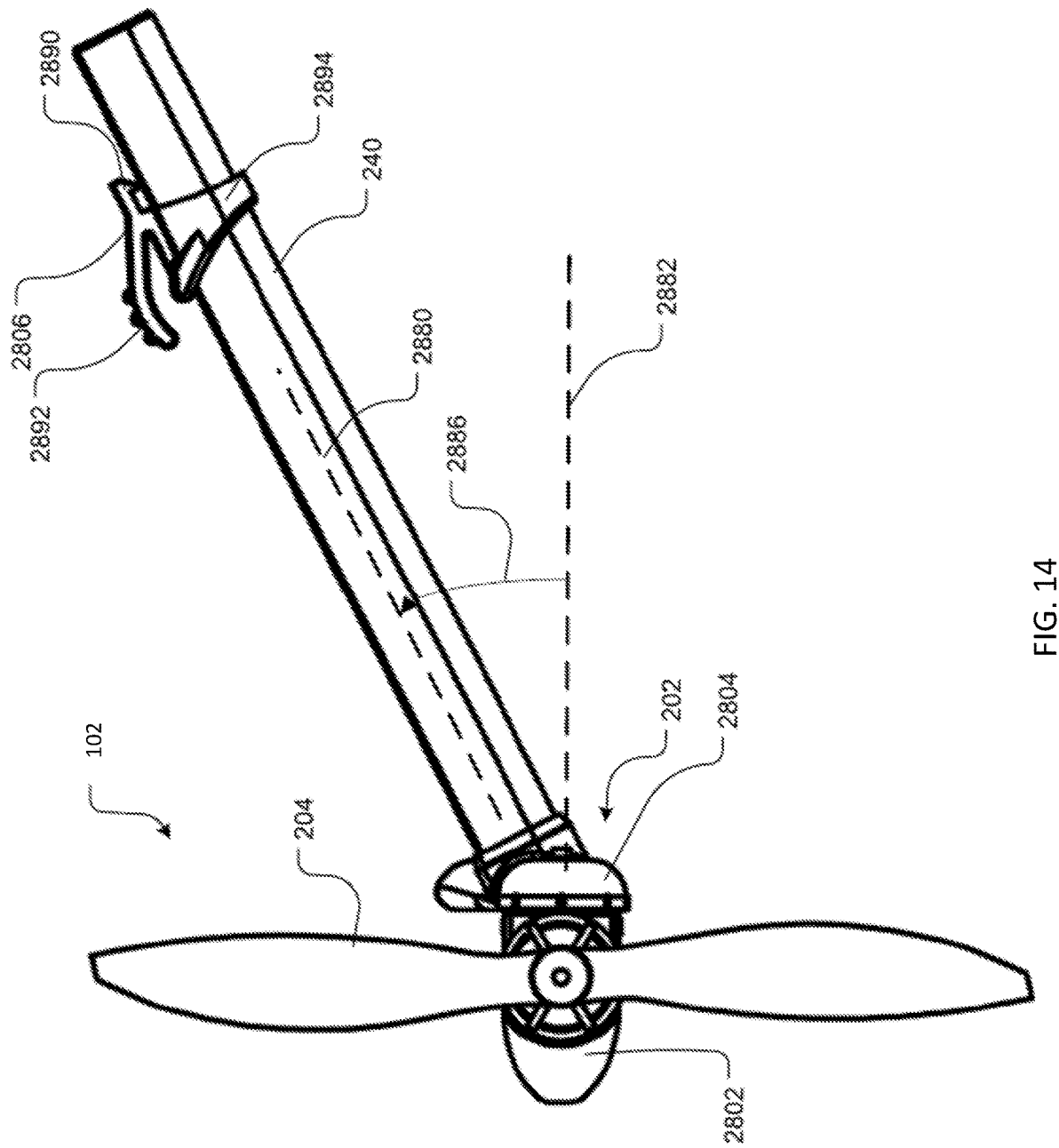
FIG. 14 illustrates a top view of a gimbaled thruster according to FIG. 13.

FIG. 14 illustrates a top view of a gimbaled thruster according to FIG. 13.

Figure 15:
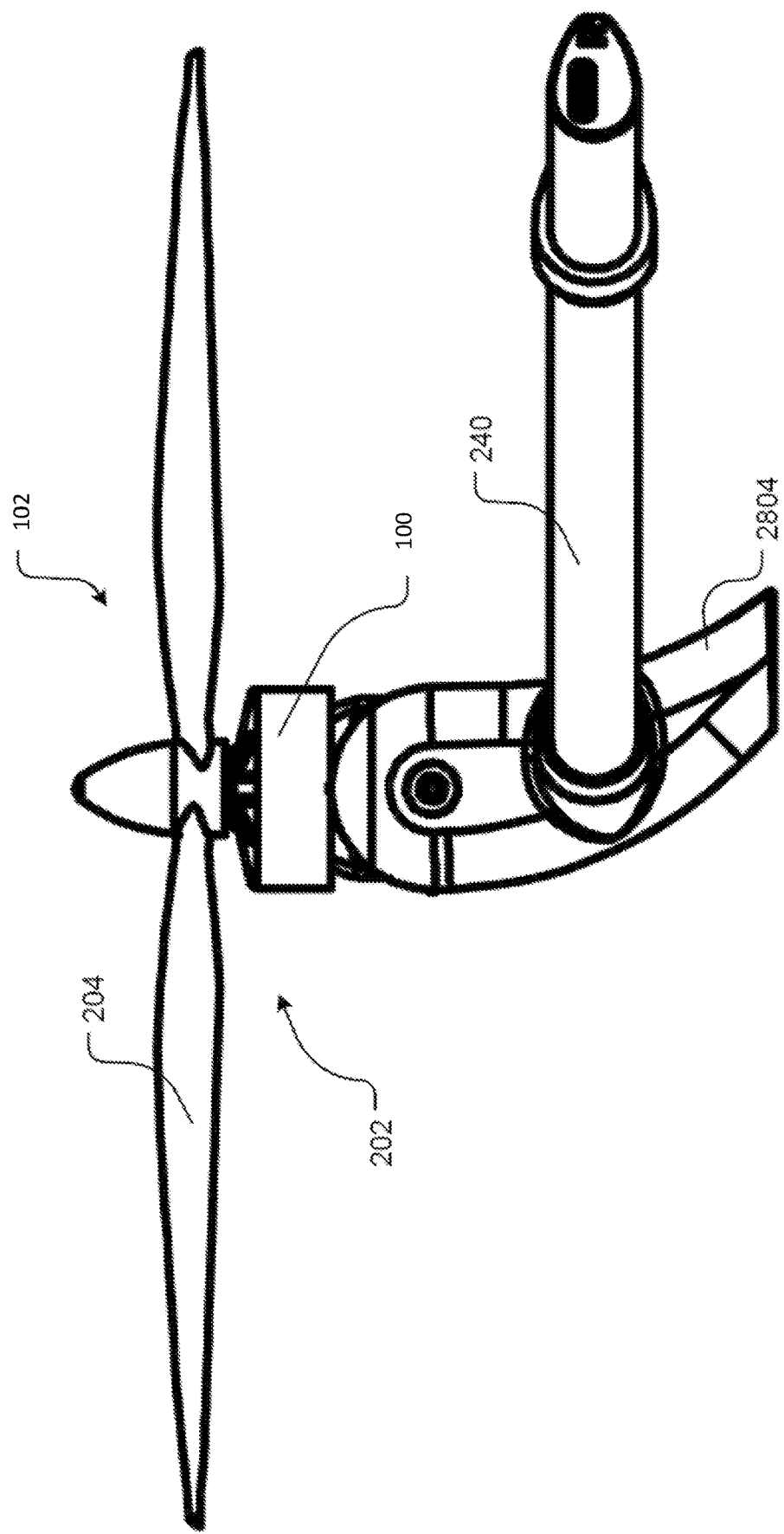
FIG. 15 illustrates a first side view of a gimbaled thruster according to FIG. 13.

FIG. 15 illustrates a first side view of a gimbaled thruster according to FIG. 13.

Figure 16:
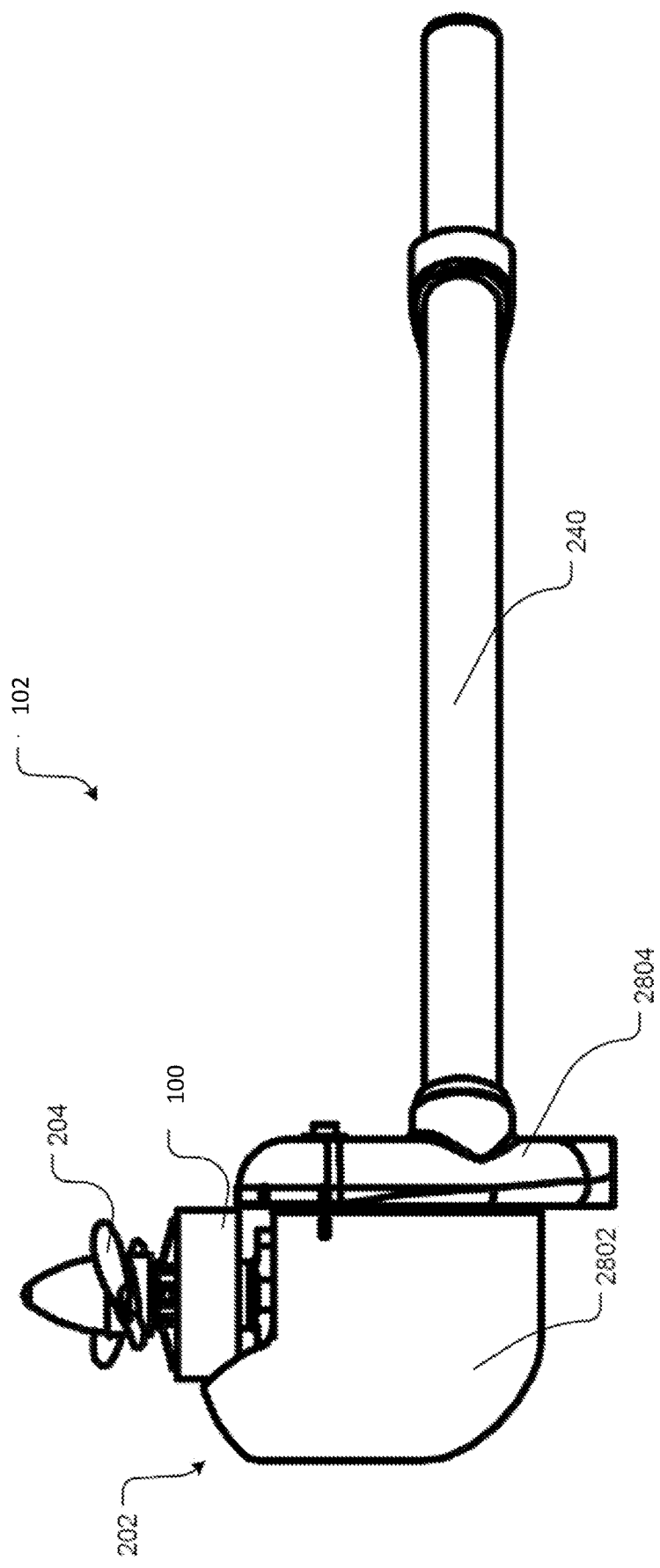
FIG. 16 illustrates a second side view of a gimbaled thruster according to FIG. 13.

FIG. 16 illustrates a second side view of a gimbaled thruster according to FIG. 13.

Figure 17:
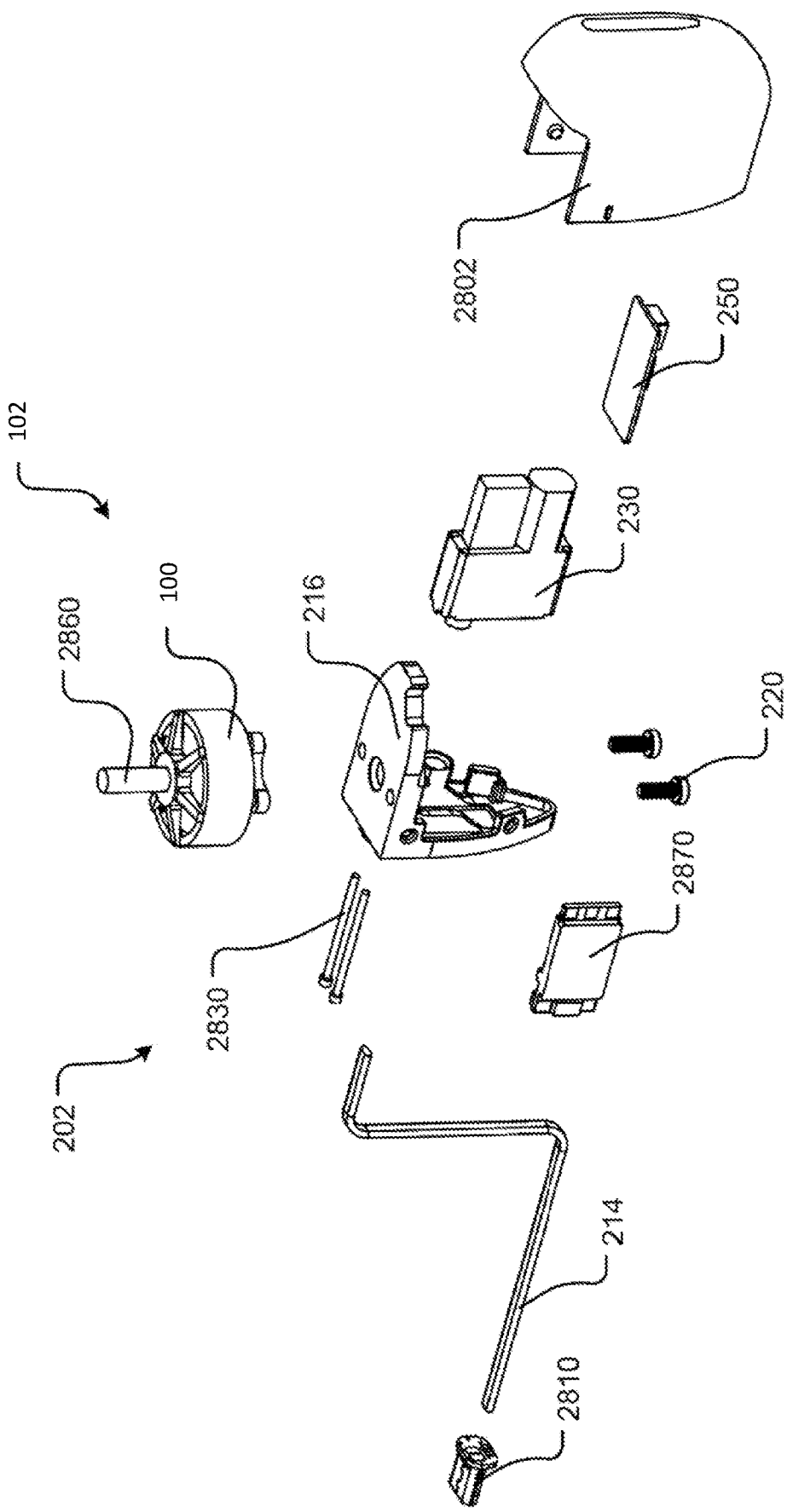
FIG. 17 illustrates a partial exploded view of a gimbaled thruster according to FIG. 13.

FIG. 17 illustrates a partial exploded view of a gimbaled thruster according to FIG. 13.

Figure 18:
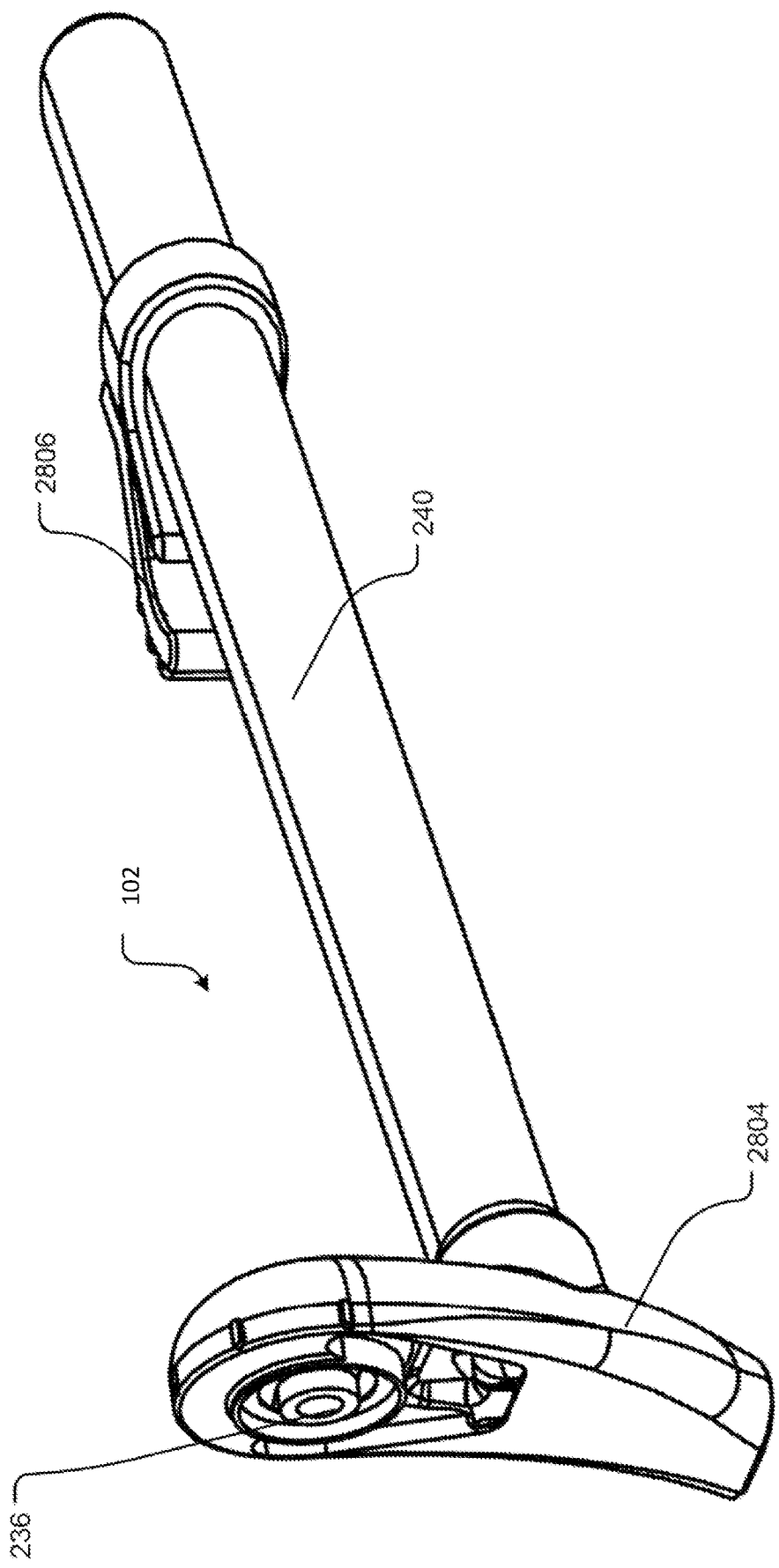
FIG. 18 illustrates the arm sub component of a gimbaled thruster according to FIG. 13.

FIG. 18 illustrates the arm sub component of a gimbaled thruster according to FIG. 13.

Figure 19:
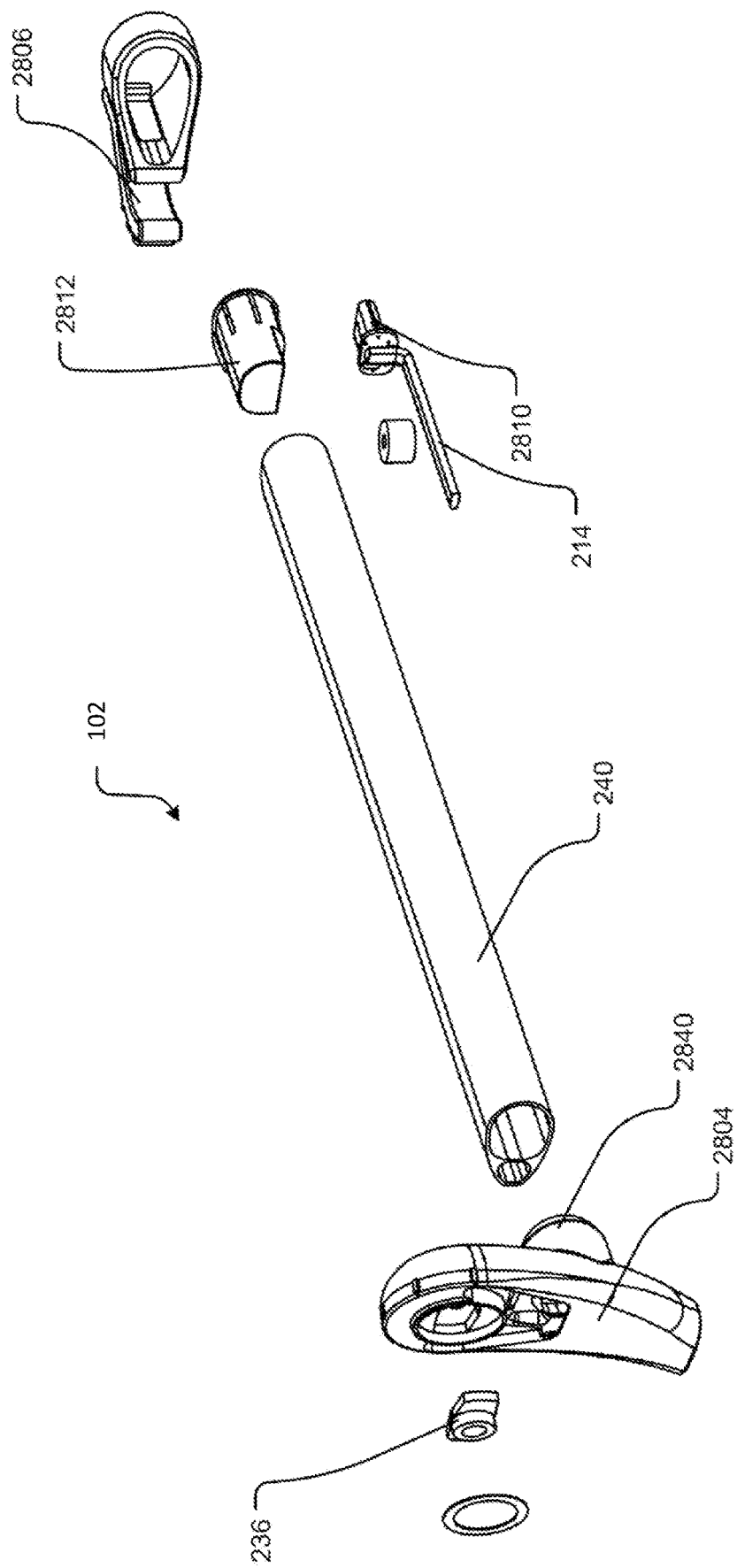
FIG. 19 illustrates a partial explored view of the arm sub component of a gimbaled thruster according to FIG. 13.

FIG. 19 illustrates a partial explored view of the arm sub component of a gimbaled thruster according to FIG. 13.

In particular, the aspects illustrated in FIGS. 12-19 and/or described herein may include any one or more of the various other aspects described herein. In particular, the aircraft 200 illustrated in FIGS. 12-19 may include an implementation of the flight controller 206 as described herein.

Moreover, the aspects illustrated in FIGS. 1-11 and/or described herein may include one or more of the aspects illustrated in FIGS. 12-19. In particular, the aspects illustrated in FIGS. 1-11 and/or described herein may include one or more of the aspects the aircraft 200 and/or the motor 100 illustrated in FIGS. 12-19.

FIG. 12 illustrates an implementation of the aircraft 200 that implements the flight controller 206. Additionally, as illustrated in FIGS. 13-19, the aircraft 200 may implement a gimbaled thruster 102 that may include a thrust motor assembly 202 that may be integrated into an arm of an aircraft structure 240 of the aircraft 200. The arm of the aircraft structure 240 may include a connector and a latch 2806. The connector and latch 2806 may snap fit into a corresponding aircraft structure.

In one aspect illustrated in FIG. 14, the connector and latch 2806 may include a hook portion 2890 that hooks onto a corresponding portion of the aircraft structure. In this regard, inserting the arm of the aircraft structure 240 into the aircraft structure may snap the hook portion 2890 into the aircraft structure.

In one aspect, the connector and latch 2806 may include a handle portion 2892 that when squeezed moves the hook portion 2890 to an unlocked position that allows the arm of the aircraft structure 240 to be removed from the aircraft structure. In one aspect, the connector and latch 2806 may include a ring portion 2894 that is configured to receive the arm of the aircraft structure 240. The connector and latch 2806 may be formed of one or more metal materials, synthetic materials, plastic materials, reinforced plastic materials, and/or the like. In one aspect, the connector and latch 2806 may be molded, 3-D printed, machined, and/or the like. Other types of connections between the arm of the aircraft structure 240 and the aircraft structure are contemplated as well.

Additionally, as illustrated in FIGS. 13-19, the gimbaled thruster 102 that includes the thrust motor assembly 202 may include a tilt pod shroud portion 2802. The tilt pod shroud portion 2802 may form a fairing having one or more curved surfaces providing a low coefficient of drag, which reduces aerodynamic drag, reduces thrust needed to maintain a desired flight envelope, increases efficiency, range, endurance, and/or the like. The tilt pod shroud portion 2802 may partially surround the motor 100. In particular, the motor 100 may be arranged and located on an upper portion of a motor mounting adapter plate 216 and the tilt pod shroud portion 2802 may partially surround the motor 100. As further illustrated in FIG. 13, a motor shaft 2860 may extend vertically from the motor 100 for connection to the propeller 204. More specifically with reference to FIG. 17, the motor 100 may attach to the motor mounting adapter plate 216. Additionally, the tilt pod shroud portion 2802 and the servo system 230 may attach to the motor mounting adapter plate 216. Then as illustrated in FIG. 13, the thrust motor assembly 202 may attach to the tilt mount portion 2804.

The arm of the aircraft structure 240 may include a tilt mount portion 2804. The tilt mount portion 2804 may be configured to mechanically fasten the thrust motor assembly 202 to the arm of the aircraft structure 240. The tilt mount portion 2804 may be further configured to keep liquid, air, dust, and/or the like away from the internal components of the thrust motor assembly 202. The tilt mount portion 2804 may form a fairing having one or more curved surfaces providing a low coefficient of drag, which reduces aerodynamic drag, reduces thrust needed to maintain a desired flight envelope, increases efficiency, range, endurance, and/or the like. The tilt mount portion 2804 may be implemented as a thin-walled structure. The tilt mount portion 2804 may have a corresponding and complementary shape to the tilt pod shroud portion 2802. Accordingly, the tilt pod shroud portion 2802 and the tilt mount portion 2804 may form a combined fairing having one or more curved surfaces providing a low coefficient of drag, which reduces aerodynamic drag, reduces thrust needed to maintain a desired flight envelope, increases efficiency, range, endurance, and/or the like. Additionally, the tilt pod shroud portion 2802 and the tilt mount portion 2804 may cover and protect various components. For example, the tilt pod shroud portion 2802 and the tilt mount portion 2804 may cover and protect the servo system 230, the motor speed controller 2870, the at least two power wires 214, the voltage regulator 250, and/or the like.

Additionally, the tilt pod shroud portion 2802 and the tilt mount portion 2804 may be configured to be waterproof or water resistant. In this regard, the tilt pod shroud portion 2802 and the tilt mount portion 2804 may include grease, seals, sealants, and/or the like. In one aspect, the thrust motor assembly 202 may include grease in a joint between the servo system 230 and the tilt mount portion 2804. The tilt pod shroud portion 2802 and the tilt mount portion 2804 may be formed of one or more metal materials, synthetic materials, plastic materials, reinforced plastic materials, and/or the like. In one aspect, the tilt pod shroud portion 2802 and the tilt mount portion 2804 may be molded, 3-D printed, machined, and/or the like.

In one or more aspects, the tilt mount portion 2804 may support the interface adapter 236 to provide the functionality as described herein. The tilt mount portion 2804 may further include a housing portion for housing the interface adapter 236. The tilt mount portion 2804 may further include an aperture extending therethrough for receiving the at least one fastener 220, which may extend through the tilt mount portion 2804, one or more washers, the interface adapter 236, and/or the like to connect to the output shaft of servo system 230, which may be located within the tilt pod shroud portion 2802 as shown in FIG. 17.

With reference to FIG. 17, the motor mounting adapter plate 216 may in part wrap around the servo system 230 and may support the motor 100, the tilt pod shroud portion 2802, the motor speed controller 2870, the voltage regulator 250, and/or the like. The servo system 230 may be attached to the motor mounting adapter plate 216 with fasteners 2830, such as bolts, screws, rivets, and/or the like. The motor mounting adapter plate 216 may further receive the at least two power wires 214 for connections to the servo system 230, the motor speed controller 2870, the voltage regulator 250, and/or the like. In one aspect, the voltage regulator 250 may be configured to provide power to the servo system 230. The at least two power wires 214 may further include a connector 2810 arranged on one end. Additionally, the at least two power wires 214 may further include signal wires. The signal wires may include one to five signal wires. The connector 2810 may facilitate manufacturing, replacement, and/or repair of the gimbaled thruster 102 and/or the thrust motor assembly 202. As illustrated in FIG. 17, the motor speed controller 2870 may be arranged entirely with the thrust motor assembly 202 and may move with the thrust motor assembly 202. The motor mounting adapter plate 216 may be formed of one or more metal materials, synthetic materials, plastic materials, reinforced plastic materials, and/or the like. In one aspect, the motor mounting adapter plate 216 may be molded, 3-D printed, machined, and/or the like. In one aspect, the motor mounting adapter plate 216 may be configured for assembly of the thrust motor assembly 202 without utilizing adhesive. In one aspect, the thrust motor assembly 202 may be configured and implemented without the motor mounting adapter plate 216. In this aspect, the thrust motor assembly 202 may be configured and implemented to provide the functionality provided by the motor mounting adapter plate 216.

The construction of the gimbaled thruster 102, the thrust motor assembly 202, the arm of the aircraft structure 240, and/or the like provides routing of the at least two power wires 214 therethrough for protection from dust, debris, and/or the like. Moreover, this construction hides the at least two power wires 214. Additionally, the voltage regulator 250 may be implemented as an integrated board configured for cable management of the at least two power wires 214 and further configured for ease of manufacturing, assembly, and/or repair.

The construction of the gimbaled thruster 102 and the thrust motor assembly 202 illustrated in FIGS. 13-19 may provide a more flexible interface to the arm of the aircraft structure 240. The arm of the aircraft structure 240 may be formed of one or more metal materials, synthetic materials, plastic materials, reinforced plastic materials, and/or the like. In one aspect, the arm of the aircraft structure 240 may be molded, extruded, 3-D printed, machined, and/or the like. In one aspect, the arm of the aircraft structure 240 may be a carbon tube. Additionally, the arm of the aircraft structure 240 may be implemented with numerous configurations such that the thrust motor assembly 202, the gimbaled thruster 102, and/or the like may be arranged at different angles. The arm of the aircraft structure 240 may also be configured with a linear construction or various angled constructions. In this regard and with reference to FIG. 14, a longitudinal axis 2880 of the arm of the aircraft structure 240 is illustrated; and an axis 2882 about which the gimbaled thruster 102 tilts is illustrated. The configuration of the gimbaled thruster 102 and the arm of the aircraft structure 240 may be such that an angle 2886 between the longitudinal axis 2880 of the arm of the aircraft structure 240 and the axis 2882 about which the gimbaled thruster 102 rotates may be 0°-180°, 0°-20°, 20°-40°, 40°-60°, 60°-80°, 80°-100°, 100°-120°, 120°-140°, 140°-160°, or 160°-180°.

The construction of the gimbaled thruster 102 and the thrust motor assembly 202 illustrated in FIGS. 13-19 further may provide increased durability for the at least two power wires 214. In this regard, a minimal length of the at least two power wires 214 may be allowed to flex after it enters the motor mounting adapter plate 216, which reduces the strain and increases service life. For example, this minimal length may be 1 cm-10 cm in length, 1 cm-3 cm in length, 3 cm-6 cm in length, or 6 cm-10 cm in length.

The arm of the aircraft structure 240 may be implemented such that it is serviceable such that the arm of the aircraft structure 240 may be removed and replaced easily in conjunction with the various components of the thrust motor assembly 202. In one aspect, the arm of the aircraft structure 240 may be implemented with a replaceable component. In this regard, the arm of the aircraft structure 240 and the gimbaled thruster 102 may be configured as an arm module that together with the connector and latch 2806 and/or the connector 2810 allows quick and easy replacement of the arm module.

With reference to FIG. 19, the arm of the aircraft structure 240 may include a hollow conduit allowing the at least two power wires 214 to extend through the arm of the aircraft structure 240 for connection to the thrust motor assembly 202. The arm of the aircraft structure 240 may further include an end cap 2812 configured to be received in one end of the arm of the aircraft structure 240. The arm of the aircraft structure 240 may connect to the tilt mount portion 2804 via an attachment portion 2840. The attachment portion 2840 may include an aperture configured to receive one end of the arm of the aircraft structure 240. The attachment portion 2840 may attach to the one end of the arm of the aircraft structure 240 with an adhesive, a fastener, a snap fit connection, and/or the like.

Accordingly, the disclosure has set forth a thrust vectoring algorithm and/or thrust vectoring controller that allows for the control of aircraft with a plurality of tilting rotors. In particular, the disclosure has set forth a thrust vectoring algorithm and/or thrust vectoring controller that allows for the control of a VTOL aircraft with a plurality of tilting rotors. Additionally, the disclosure has set forth an aircraft implementing a thrust vectoring algorithm and/or thrust vectoring controller that allows for the control of the aircraft with a plurality of tilting rotors. In particular, the disclosure has set forth an aircraft implementing a thrust vectoring algorithm and/or thrust vectoring controller that allows for the control of a VTOL aircraft with a plurality of tilting rotors.

The following are a number of nonlimiting examples of aspects of the disclosure. One example includes a method for controlling a thrust vectored aircraft, the thrust vectored aircraft being implemented with one or more tiltable thrusting motors, the method includes: mapping aircraft control commands with a flight controller through the following transformations: transforming, with the flight controller, a command space, which includes a force command and a moment command, into an inner-mixing space, which includes of at least a pair of two orthogonal force components located at each thrusting motor; transforming, with the flight controller, the inner-mixing space into an outer-mixing space, which includes a thrust angle and thrust magnitude pair located at each thrusting motor; and generating output commands with the flight controller.

The above-noted example may further include any one or a combination of more than one of the following aspects. The method includes transforming, with the flight controller, the outer-mixing space into an output command space, which includes a thrust angle and a thrust magnitude pair that accounts for nonlinearities of thrust control. The transforming a command space includes implementing a mixing matrix with the flight controller. The transforming the inner-mixing space into the outer-mixing space is constrained. The transforming the inner-mixing space into the outer-mixing space is constrained such that the output commands remain within feasible limits of the one or more tiltable thrusting motors. The method includes implementing the thrust vectored aircraft with two of the one or more tiltable thrusting motors and one non-tiltable thrusting motors. The thrust vectored aircraft being implemented with zero or more non-tiltable thrusting motors. The transforming the inner-mixing space into the outer-mixing space is constrained such that the output commands remain within feasible limits of the one or more tiltable thrusting motors and the zero or more non-tiltable thrusting motors. The method includes implementing the thrust vectored aircraft with two of the one or more tiltable thrusting motors and two non-tiltable thrusting motors. The method includes implementing the thrust vectored aircraft with four of the one or more tiltable thrusting motors and zero non-tiltable thrusting motors. The method includes implementing the thrust vectored aircraft with four of the one or more tiltable thrusting motors arranged in a "quad +" configuration. The method includes implementing the thrust vectored aircraft with four of the one or more tiltable thrusting motors arranged in a "quad x" configuration. The method includes implementing the thrust vectored aircraft with two of the one or more tiltable thrusting motors and a single fixed motor arranged in a tri-y configuration. The method includes implementing the thrust vectored aircraft with one or more tiltable thrusting motors arranged in a hex configuration. The method includes implementing the thrust vectored aircraft with one or more tiltable thrusting motors arranged in an octo configuration. The method includes implementing the thrust vectored aircraft with one or more tiltable thrusting motors arranged on and around an aircraft body.

One example includes an aircraft system configured to control a thrust vectored aircraft, the thrust vectored aircraft being implemented with one or more tiltable thrusting motors, the aircraft system includes: a flight controller configured to map aircraft control commands through the following transformations: the flight controller further configured to transform from a command space, which includes a force command and a moment command, into an inner-mixing space, which includes at least a pair of two orthogonal force components located at each thrusting motor; the flight controller further configured to transform the inner-mixing space into an outer-mixing space, which includes a thrust angle and thrust magnitude pair located at each thrusting motor; and the flight controller further configured to generate output commands.

The above-noted example may further include any one or a combination of more than one of the following aspects. The aircraft system where the flight controller further configured to transform the outer-mixing space into an output command space, which includes a thrust angle and a thrust magnitude pair accounting for nonlinearities of thrust control. The flight controller is further configured to transform a command space that includes implementing a mixing matrix. The flight controller is further configured to transform the inner-mixing space into the outer-mixing space while remaining constrained. The flight controller is further configured to transform a command space into the outer-mixing space while remaining constrained such that the output commands remain within feasible limits of the one or more tiltable thrusting motors. The flight controller is further configured to implement the thrust vectored aircraft with two of the one or more tiltable thrusting motors and one non-tiltable thrusting motor. The thrust vectored aircraft being implemented with zero or more non-tiltable thrusting motors. The flight controller is further configured for transforming the inner-mixing space into the outer-mixing space while constrained such that the output commands remain within feasible limits of the one or more tiltable thrusting motors and the zero or more non-tiltable thrusting motors. The flight controller is further configured to implement the thrust vectored aircraft with two of the one or more tiltable thrusting motors and two non-tiltable thrusting motors. An aircraft includes the aircraft system and the aircraft includes the thrust vectored aircraft with four of the one or more tiltable thrusting motors and zero non-tiltable thrusting motors. An aircraft includes the aircraft system and the aircraft includes the thrust vectored aircraft with four of the one or more tiltable thrusting motors arranged in a "quad +" configuration. An aircraft includes the aircraft system and the aircraft includes the thrust vectored aircraft with four of the one or more tiltable thrusting motors arranged in a "quad x" configuration. An aircraft includes the aircraft system and the aircraft includes the thrust vectored aircraft with two of the one or more tiltable thrusting motors and a single fixed motor arranged in a tri-y configuration. An aircraft includes the aircraft system and the aircraft includes the thrust vectored aircraft with one or more tiltable thrusting motors arranged in a hex configuration. An aircraft includes the aircraft system and the aircraft includes the thrust vectored aircraft with one or more tiltable thrusting motors arranged in an octo configuration.

Aspects of the disclosure have been described above with reference to the accompanying drawings, in which aspects of the disclosure are shown. It will be appreciated, however, that this disclosure may, however, be embodied in many different forms and should not be construed as limited to the aspects set forth above. Rather, these aspects are provided so that this disclosure will be thorough and complete, and will fully convey the scope of the disclosure to those skilled in the art. Additionally, the various aspects described may be implemented separately. Moreover, one or more the various aspects described may be combined. Like numbers refer to like elements throughout.

According to an example, the global navigation satellite system (GNSS) receiver may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a GNSS. Such a GNSS may comprise, for example, a Global Positioning System (GPS), Galileo, Glonass, to name a few, or any GNSS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of GNSS as specific illustrations according to particular examples, it should be understood that these techniques may also apply to other types of GNSS, and that claimed subject matter is not limited in this respect.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an inter-network, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, Pulse Width Modulation (PWM), Transistor-Transistor Logic (TTL) Serial, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

It will be understood that, although the terms first, second, etc. are used throughout this specification to describe various elements, these elements should not be limited by these terms. These terms are only used to distinguish one element from another. For example, a first element could be termed a second element, and, similarly, a second element could be termed a first element, without departing from the scope of the disclosure. The term "and/or" includes any and all combinations of one or more of the associated listed items.

The terminology used herein is for the purpose of describing particular aspects only and is not intended to be limiting of the disclosure. As used herein, the singular forms "a," "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Relative terms such as "below" or "above" or "upper" or "lower" or "top" or "bottom" may be used herein to describe a relationship of one element, layer or region to another element, layer or region as illustrated in the figures. It will be understood that these terms are intended to encompass different orientations of the device in addition to the orientation depicted in the figures.

In the drawings and specification, there have been disclosed typical aspects of the disclosure and, although specific terms are employed, they are used in a generic and descriptive sense only and not for purposes of limitation, the scope of the disclosure being set forth in the following claims.

Aspects of the disclosure may be implemented in any type of computing devices, such as, e.g., a desktop computer, personal computer, a laptop/mobile computer, a personal data assistant (PDA), a mobile phone, a tablet computer, cloud computing device, and/or the like, with wired/wireless communications capabilities via the communication channels.

Further in accordance with various aspects of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

The artificial intelligence and/or machine learning may utilize any number of approaches including one or more of cybernetics and brain simulation, symbolic, cognitive simulation, logic-based, anti-logic, knowledge-based, sub-symbolic, embodied intelligence, computational intelligence and soft computing, machine learning and statistics, and the like.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

We claim:

1. A method for controlling a thrust vectored aircraft, the thrust vectored aircraft being implemented with one or more tiltable thrusting motors, the method comprising:
   receiving and/or generating aircraft control commands that comprise a roll moment, a pitch moment, a yaw moment, a longitudinal force, a lateral force, and a vertical force representing six degrees-of-freedom of an aircraft body;
   mapping the aircraft control commands with a flight controller through the following transformations:
   transforming, with the flight controller, a command space, which comprises the aircraft control commands that include a force command and a moment command, into an inner-mixing space, which comprises at least a pair of two orthogonal force components located at each of the one or more tiltable thrusting motors;
   transforming, with the flight controller, the inner-mixing space into an outer-mixing space, which comprises a thrust angle and thrust magnitude pair located at each of the one or more tiltable thrusting motors; and
   generating output commands with the flight controller to the one or more tiltable thrusting motors,
   wherein the transforming a command space comprises implementing a mixing matrix with the flight controller.

2. The method of claim 1 further comprising transforming, with the flight controller, the outer-mixing space into an output command space, which comprises a thrust angle and a thrust magnitude pair that accounts for nonlinearities of thrust control,
   wherein the at least a pair of two orthogonal force components comprise a horizontal thrust component and a vertical thrust component for each of the one or more tiltable thrusting motors.

3. The method of claim 1
   wherein the mixing matrix comprises a linear function represented by a 2 n+m*6 matrix, where n is a number of tiltable thrusting motors and m is a number of fixed implementations of thrusting motors.

4. The method of claim 1 further comprising generating a feasible output that the one or more tiltable thrusting motors can actuate such that the transforming the inner-mixing space into the outer-mixing space is constrained.

5. The method of claim 1 further comprising:
   implementing the thrust vectored aircraft with two tiltable thrusting motors and one non-tiltable thrusting motors; and
   implementing the transformations to generate output commands with the flight controller for the two tiltable thrusting motors and one non-tiltable thrusting motors.

6. The method of claim 1 wherein the thrust vectored aircraft being implemented with one or more non-tiltable thrusting motors.

7. The method of claim 6 further comprising generating a feasible output that the one or more tiltable thrusting motors can actuate such that the transforming the inner-mixing space into the outer-mixing space is constrained such that the output commands remain within feasible limits of the one or more tiltable thrusting motors and the one or more non-tiltable thrusting motors.

8. The method of claim 1 further comprising:
   implementing the thrust vectored aircraft with two tiltable thrusting motors and two non-tiltable thrusting motors; and
   implementing the transformations to generate output commands with the flight controller for the two tiltable thrusting motors and two non-tiltable thrusting motors.

9. The method of claim 1 further comprising implementing the thrust vectored aircraft with four tiltable thrusting motors and zero non-tiltable thrusting motors.

10. The method of claim 1 further comprising:
    implementing the thrust vectored aircraft with four tiltable thrusting motors arranged in a configuration with at least one of the more one or more tiltable thrusting motors on a centerline of the thrust vectored aircraft; and
    implementing the transformations to generate output commands with the flight controller for the four tiltable thrusting motors.

11. The method of claim 1 further comprising:
implementing the thrust vectored aircraft with four tiltable thrusting motors arranged in a configuration with none of the one or more tiltable thrusting motors on a centerline of the thrust vectored aircraft: and
implementing the transformations to generate output commands with the flight controller for the four tiltable thrusting motors.

12. The method of claim 1 further comprising:
implementing the thrust vectored aircraft with two tiltable thrusting motors and a single fixed motor arranged in a triangular configuration; and
implementing the transformations to generate output commands with the flight controller for the two tiltable thrusting motors and a single fixed motor.

13. The method of claim 1 further comprising:
implementing the thrust vectored aircraft with six tiltable thrusting motors arranged in a hexagon configuration; and
implementing the transformations to generate output commands with the flight controller for the six tiltable thrusting motors arranged in a hexagon configuration.

14. The method of claim 1 further comprising:
implementing the thrust vectored aircraft with eight tiltable thrusting motors arranged in an octagon configuration; and
implementing the transformations to generate output commands with the flight controller for the eight tiltable thrusting motors arranged in an octagon configuration.

15. The method of claim 1 further comprising implementing the thrust vectored aircraft with one or more tiltable thrusting motors arranged on and around an aircraft body.

16. A method for controlling a thrust vectored aircraft, the thrust vectored aircraft being implemented with one or more tiltable thrusting motors, the method comprising:
receiving and/or generating aircraft control commands that comprise a roll moment, a pitch moment, a yaw moment, a longitudinal force, a lateral force, and a vertical force representing six degrees-of-freedom of an aircraft body;
mapping aircraft the control commands with a flight controller through the following transformations:
transforming, with the flight controller, a command space, which comprises the aircraft control commands that include a force command and a moment command, into an inner-mixing space, which comprises at least a pair of two orthogonal force components located at each of the one or more tiltable thrusting motors;
transforming, with the flight controller, the inner-mixing space into an outer-mixing space, which comprises a thrust angle and thrust magnitude pair located at each of the one or more tiltable thrusting motors;
generating output commands with the flight controller to the one or more tiltable thrusting motors; and
generating a feasible output that the one or more tiltable thrusting motors can actuate such that the transforming the inner-mixing space into the outer-mixing space is constrained such that the output commands remain within feasible limits of the one or more tiltable thrusting motors.

17. An aircraft system configured to control a thrust vectored aircraft, the thrust vectored aircraft being implemented with one or more tiltable thrusting motors, the aircraft system comprising:
a flight controller configured to receive and/or generate aircraft control commands that comprise a roll moment, a pitch moment, a yaw moment, a longitudinal force, a lateral force, and a vertical force representing six degrees-of-freedom of an aircraft body;
the flight controller further configured to map aircraft the control commands through the following transformations:
the flight controller further configured to transform from a command space, which comprises the aircraft control commands that include a force command and a moment command, into an inner-mixing space, which comprises at least a pair of two orthogonal force components located at each of the one or more tiltable thrusting motors;
the flight controller further configured to transform the inner-mixing space into an outer-mixing space, which comprises a thrust angle and thrust magnitude pair located at each of the one or more tiltable thrusting motors; and
the flight controller further configured to generate output commands to the one or more tiltable thrusting motors,
wherein the flight controller is further configured to transform the outer-mixing space into an output command space, which comprises a thrust angle and a thrust magnitude pair accounting for nonlinearities of thrust control.

18. The aircraft system of claim 17
wherein the at least a pair of two orthogonal force components comprise a horizontal thrust component and a vertical component for each of the one or more tiltable thrusting motors.

19. The aircraft system of claim 17
wherein the flight controller is further configured to transform a command space that comprises implementing a mixing matrix; and
wherein the mixing matrix comprises a linear function represented by a 2 n+mx6 matrix, where n is a number of tiltable thrusting motors and m is a number of fixed implementations of thrusting motors.

20. The aircraft system of claim 17 wherein the flight controller is further configured to generate a feasible output that the one or more tiltable thrusting motors can actuate so as to transform the inner-mixing space into the outer-mixing space while remaining constrained.

21. The aircraft system of claim 17 wherein the flight controller is further configured to generate a feasible output that the one or more tiltable thrusting motors can actuate so as to transform a command space into the outer-mixing space while remaining constrained such that the output commands remain within feasible limits of the one or more tiltable thrusting motors.

22. The aircraft system of claim 17
wherein the flight controller is further configured to implement the thrust vectored aircraft with two tiltable thrusting motors and one non-tiltable thrusting motor; and
wherein the flight controller is further configured to implement the transformations to generate output commands with the flight controller for the two tiltable thrusting motors and one non-tiltable thrusting motors.

23. The aircraft system of claim 17 wherein the thrust vectored aircraft being implemented with one or more non-tiltable thrusting motors.

24. The aircraft system of claim 17 wherein the flight controller is further configured generate a feasible output that the one or more tiltable thrusting motors can actuate so as to implement transforming the inner-mixing space into the outer-mixing space while constrained such that the output commands remain within feasible limits of the one or more tiltable thrusting motors and the one or more non-tiltable thrusting motors.

25. The aircraft system of claim 17
wherein the flight controller is further configured to implement the thrust vectored aircraft with two tiltable thrusting motors and two non-tiltable thrusting motors; and
wherein the flight controller is further configured to implement the transformations to generate output commands with the flight controller for the two tiltable thrusting motors and two non-tiltable thrusting motors.

26. An aircraft comprising the aircraft system of claim 17 and the aircraft comprising the thrust vectored aircraft with four tiltable thrusting motors and zero non-tiltable thrusting motors,
wherein the flight controller is further configured to implement the transformations to generate output commands with the flight controller for the four tiltable thrusting motors and zero non-tiltable thrusting motors.

27. An aircraft comprising the aircraft system of claim 17 and the aircraft comprising the thrust vectored aircraft with four tiltable thrusting motors arranged in a configuration with at least one of the four tiltable thrusting motors on a centerline of the aircraft,
wherein the flight controller is further configured to implement the transformations to generate output commands with the flight controller for the four tiltable thrusting motors.

28. An aircraft comprising the aircraft system of claim 17 and the aircraft comprising the thrust vectored aircraft with four tiltable thrusting motors arranged in a configuration with none of the four tiltable thrusting motors on a centerline of the aircraft,
wherein the flight controller is further configured to implement the transformations to generate output commands with the flight controller for the four tiltable thrusting motors.

29. An aircraft comprising the aircraft system of claim 17 and the aircraft comprising the thrust vectored aircraft with two tiltable thrusting motors and a single fixed motor arranged in a triangular configuration,
wherein the flight controller is further configured to implement the transformations to generate output commands with the flight controller for the two tiltable thrusting motors and a single fixed motor.

30. An aircraft comprising the aircraft system of claim 17 and the aircraft comprising the thrust vectored aircraft with six tiltable thrusting motors arranged in a hexagon configuration,
wherein the flight controller is further configured to implement the transformations to generate output commands with the flight controller for the six tiltable thrusting motors.

31. An aircraft comprising the aircraft system of claim 17 and the aircraft comprising the thrust vectored aircraft with eight tiltable thrusting motors arranged in an octagon configuration,
wherein the flight controller is further configured to implement the transformations to generate output commands with the flight controller for the eight tiltable thrusting motors.

* * * * *